United States Patent
Shamoto et al.

(10) Patent No.: US 11,108,351 B2
(45) Date of Patent: Aug. 31, 2021

(54) ELECTRIC MOTOR CONTROL DEVICE

(71) Applicant: TOYOTA JIDOSHA KABUSHIKI KAISHA, Toyota (JP)

(72) Inventors: Yoshihiro Shamoto, Kounan (JP); Hiroyuki Oyanagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 16/794,684

(22) Filed: Feb. 19, 2020

(65) Prior Publication Data

US 2020/0287496 A1    Sep. 10, 2020

(30) Foreign Application Priority Data

Mar. 5, 2019 (JP) .............................. JP2019-039225

(51) Int. Cl.
*H02P 27/08* (2006.01)
*H02M 7/5387* (2007.01)
*H02M 3/158* (2006.01)

(52) U.S. Cl.
CPC ...... *H02P 27/085* (2013.01); *H02M 7/53871* (2013.01); *H02M 3/158* (2013.01); *H02P 2201/09* (2013.01)

(58) Field of Classification Search
None
See application file for complete search history.

(56) References Cited

U.S. PATENT DOCUMENTS

| 4,561,055 A * | 12/1985 | McKee | .............. F16H 59/08 |
| | | | 701/52 |
| 2003/0155878 A1 | 8/2003 | Murai | |
| 2007/0241719 A1* | 10/2007 | Itoh | .............. H02M 7/5387 |
| | | | 318/801 |
| 2009/0108794 A1* | 4/2009 | Ochiai | .............. H02P 27/08 |
| | | | 318/760 |
| 2010/0013421 A1* | 1/2010 | Itoh | .............. H02M 7/00 |
| | | | 318/400.09 |

(Continued)

FOREIGN PATENT DOCUMENTS

| EP | 3352369 A1 | 7/2018 |
| JP | 2000-50686 A | 2/2000 |

(Continued)

*Primary Examiner* — Bentsu Ro
(74) *Attorney, Agent, or Firm* — Sughrue Mion, PLLC

(57) ABSTRACT

An electric motor control device includes an electronic control unit configured to perform switching control of a switching element of an inverter in PWM control mode when a modulation degree is less than a first predetermined value, perform switching control of the switching element in square wave control mode when the modulation degree is greater than or equal to a second predetermined value, and perform switching control of the switching element in intermediate control mode when the modulation degree is greater than or equal to the first predetermined value and less than the second predetermined value. The intermediate control mode uses a switching pattern in which, in a pulse pattern in the square wave control mode, a slit or a short pulse having the same width as the slit is formed according to whether a pulse is present at the time when a phase current crosses zero.

14 Claims, 11 Drawing Sheets

(56) References Cited

U.S. PATENT DOCUMENTS

| | | | | |
|---|---|---|---|---|
| 2010/0019728 A1* | 1/2010 | Ichikawa | ................ | B60L 1/003 320/134 |
| 2011/0115420 A1* | 5/2011 | Yamada | ................ | H02P 27/04 318/400.09 |
| 2012/0136547 A1* | 5/2012 | Miyazaki | .............. | B60T 8/4081 701/70 |
| 2014/0176029 A1 | 6/2014 | Nomura et al. | | |
| 2017/0313206 A1 | 11/2017 | Yamamoto et al. | | |
| 2019/0248248 A1 | 8/2019 | Shamoto et al. | | |

FOREIGN PATENT DOCUMENTS

| | | |
|---|---|---|
| JP | 2014128052 A | 7/2014 |
| JP | 2017-131094 A | 7/2017 |
| JP | 2019-146281 A | 8/2019 |

* cited by examiner

ELECTRIC MOTOR CONTROL DEVICE

INCORPORATION BY REFERENCE

The disclosure of Japanese Patent Application No. 2019-039225 filed on Mar. 5, 2019 including the specification, drawings and abstract is incorporated herein by reference in its entirety.

BACKGROUND

1. Technical Field

The present disclosure relates to an electric motor control device.

2. Description of Related Art

As a type of electric motor control device, a technology has been proposed in which switching control of a switching element of an inverter is performed in a square wave control mode using a new pulse pattern, with three pulses in one period, when an operating point of a motor lies in a resonance region where resonance occurs in a booster circuit (see, for example, Japanese Unexamined Patent Application Publication No. 2017-131094). In new pulse pattern, the sixth electric frequency of the driving power of the motor is made higher by switching control, and as a result, the occurrence of LC resonance in the booster circuit is avoided.

SUMMARY

However, when switching from pulse width modulation control mode (the PWM control mode) to square wave control mode in the electric motor control device described above, resonance may occur in a region where the modulation degree is high (for example, in a region where the modulation degree is 0.70 or higher). It is considered that when switching control of the switching element of the inverter in the PWM control mode is performed in a region where the modulation degree is high, the sixth component of electric frequency of the driving power of the motor is made higher, and when the frequency having the component gets close to the LC resonance frequency, resonance occurs.

In addition, in the square wave control mode, when a plurality of switching patterns are used according to the number of revolutions of the motor, vibration due to torque fluctuation may occur caused by a sudden change in the modulation degree when switching between the plurality of switching patterns.

An electric motor control device according to the present disclosure present disclosure curbs resonance or vibration that may occur when switching control mode or a switching pattern.

The electric motor control device according to the present disclosure employs the following aspects.

An electric motor control device according to a first aspect of the present disclosure is mounted on a drive device that includes an electric motor, an inverter which drives the electric motor, and a power storage device which exchanges power with the electric motor through the inverter. The electric motor control device includes an electronic control unit configured to perform switching control of a switching element of the inverter in pulse width modulation control mode when a modulation degree is less than a first predetermined value, perform switching control of the switching element of the inverter in square wave control mode when the modulation degree is greater than or equal to a second predetermined value, which is greater than the first predetermined value, and perform switching control of the switching element of the inverter in intermediate control mode when the modulation degree is greater than or equal to the first predetermined value and less than the second predetermined value. The intermediate control mode uses a switching pattern in which, in a pulse pattern in the square wave control mode, a slit is formed in a case where a pulse is present at the time when a phase current crosses zero and a short pulse having the same width as the slit is formed in a case where a pulse is not present at the time when the phase current crosses zero.

In the electric motor control device according to the first aspect, the electronic control unit performs switching control of the switching element of the inverter in the pulse width modulation control mode when the modulation degree is less than the first predetermined value, performs switching control of the switching element of the inverter in the square wave control mode when the modulation degree is greater than or equal to the second predetermined value that is greater than the first predetermined value, and performs switching control of the switching element of the inverter in the intermediate control mode when the modulation degree is greater than or equal to the first predetermined value and less than the second predetermined value, which has the switching pattern in which, in the pulse pattern in the square wave control mode, the slit is formed in the case where the pulse is present at the time when the phase current crosses zero and the short pulse having the same width as the slit is formed in the case where the pulse is not present at the time when the phase current crosses zero. As such, since the modulation degree does not suddenly change from the first predetermined value to the second predetermined value, it is possible to curb vibration caused by torque fluctuation. In addition, by switching from the pulse width modulation control mode to the square wave control mode through the intermediate control mode, the pulse width modulation control mode is not used in a region where the modulation degree is high such that resonance occurs, and thus it is possible to curb resonance that may occur due to using the pulse width modulation control mode in a region where the modulation degree is high.

In the first aspect, the intermediate control mode may be mode using the switching pattern in which the widths of the slit and the short pulse are decreased as the modulation degree is increased. As such, it is possible to smoothly change the modulation degree, or the widths of the slit and the short pulse when switching from the pulse width modulation control mode to the square wave control mode through the intermediate control mode.

In the first aspect, the electronic control unit may gradually change the widths of the slit and short pulse until the widths become zero when switching from the intermediate control mode to the square wave control mode. As such, it is possible to curb the torque fluctuation that may occur when switching from the intermediate control mode to the square wave control mode.

In the first aspect, the square wave control mode may use a square wave pulse pattern in which a first half or a second half of one period becomes a square wave pulse when the number of revolutions of the electric motor is greater than or equal to a first predetermined number of revolutions which is greater than a first resonance region, and uses a first switching pattern in which one or more slits are formed in a region where the square wave pulse is present and one or more short pulses, having the same width as the slits, are formed at the same time when the slits are formed, in a region where the square wave pulse is not present in the square wave pulse pattern. The first switching pattern curbs LC resonance in the first resonance region. The second predetermined value is greater when the number of revolutions of the electric motor is greater than or equal to the first predetermined number of revolutions than when the number of revolutions is less than the first predetermined number of revolutions. As such, it is possible to curb LC resonance in the first resonance region.

In the first aspect, the square wave control mode may use a second switching pattern when the number of revolutions of the electric motor is less than a second predetermined number of revolutions which is less than the first predetermined number of revolutions. The second switching pattern has a larger number of slits and short pulses than the slits and the short pulses of the first switching pattern and curbs LC resonance in a second resonance region included in a range of the number of revolutions less than the second predetermined number of revolutions. The second predetermined value is less when the number of revolutions of the electric motor is less than the second predetermined number of revolutions than when the number of revolutions is greater than or equal to the second predetermined number of revolutions. As such, it is possible to curb LC resonance in the second resonance region.

An electric motor control device according to a second aspect of the present disclosure is mounted on a drive device that includes an electric motor, an inverter which drives the electric motor, and a power storage device which exchanges power with the electric motor through the inverter. The electric motor control device includes an electronic control unit configured to perform switching control of a switching element of the inverter by switching between pulse width modulation control mode and square wave control mode according to a modulation degree. The square wave control mode uses a square wave pulse pattern in which a first half or a second half of one period becomes a square wave pulse when the number of revolutions of the electric motor is greater than or equal to a first predetermined number of revolutions which is greater than a first resonance region, and uses a first switching pattern in which one or more slits are formed in a region where the square wave pulse is present and one or more short pulses, having the same width as the slits, are formed at the same time when the slits are formed, in a region where the square wave pulse is not present in the square wave pulse pattern. The first switching pattern curbs LC resonance in the first resonance region. The electronic control unit performs control of a first gradual variation in which widths of the slits and the short pulses of the first switching pattern gradually change to become small, when switching from the first switching pattern to the square wave pulse pattern.

In the electric motor control device according to the second aspect, the electronic control unit is configured to perform switching control of the switching element of the inverter which drives the electric motor by switching between the pulse width modulation control mode and the square wave control mode according to the modulation degree. The square wave control mode uses the square wave pulse pattern in which the first half or the second half of the period becomes the square wave pulse when the number of revolutions of the electric motor is greater than or equal to the first predetermined number of revolutions which is greater than the first resonance region, and uses the first switching pattern in which one or more slits are formed in a region where the square wave pulse is present in the square wave pulse pattern and one or more short pulses, having the same width as the slits, are formed at the same time when the slits are formed, in a region where the square wave pulse is not present. The first switching pattern curbs LC resonance in the first resonance region. As such, it is possible to curb resonance that may occur when the number of revolutions of the electric motor is less than the first predetermined number of revolutions. Furthermore, the electronic control unit is configured to perform control of a first gradual variation in which the widths of the slits and the short pulses of the first switching pattern gradually change to become small when switching from the first switching pattern to the square wave pulse pattern. As such, it is possible to curb vibration due to torque fluctuation occurring together with a sudden change in the modulation degree that may occur when switching from the first switching pattern to the square wave pulse pattern.

In the second aspect, as the control of the first gradual variation, the electronic control unit may set the widths of the slits and the short pulses, or the modulation degree step by step in a plurality of steps. As such, it is possible to change the widths of the slit and the short pulse, or the modulation degree step by step so as to switch from the first switching pattern to the square wave pulse pattern, thereby curbing vibration due to torque fluctuation that may occur at the time of switching.

In the second aspect, as the control of the first gradual variation when the number of revolutions of the electric motor exceeds a first threshold number of revolutions for switching the first switching pattern to the square wave pulse pattern, the electronic control unit may set the modulation degree to be gradually increased from the modulation degree of the first switching pattern toward the modulation degree of the square wave pulse pattern, and set the widths of the slit and the short pulse by using the set modulation degree and a relationship in which the widths are decreased, as the modulation degree is increased. As such, it is possible to smoothly change the widths of the slit and the short pulse, or the modulation degree so as to switch from the first switching pattern to the square wave pulse pattern, thereby curbing vibration due to torque fluctuation that may occur at the time of switching.

In the second aspect, as the control of the first gradual variation, the electronic control unit may set a voltage phase according to the set modulation degree, and perform switching control of the switching element of the inverter such that the set voltage phase is achieved in the first switching pattern in which the set widths of the slits and short pulses are used. As such, it is possible to curb torque fluctuation.

In the second aspect, the square wave control mode may use a second switching pattern when the number of revolutions of the electric motor is less than a second predetermined number of revolutions which is less than the first predetermined number of revolutions. The second switching pattern has a larger number of slits and short pulses than the slits and the short pulses of the first switching pattern, and curbs LC resonance in the second resonance region included in a range of number of revolutions less than the second predetermined number of revolutions. When switching from the second switching pattern to the first switching pattern, the electronic control unit may perform control of a second gradual variation in which the widths of the slits and the short pulses of the second switching pattern, which do not correspond to the slits and short pulses of the first switching pattern, gradually change to become small. As such, it is possible to curb vibration that may occur when the number of revolutions of the electric motor is less than the second predetermined number of revolutions, and vibration due to torque fluctuation occurring together with a sudden change in the modulation degree that may occur at the time of switching from the second switching pattern to the first switching pattern.

In the second aspect, as the control of the second gradual variation, the electronic control unit may set the widths of the slits and the short pulses, or the modulation degree step by step in a plurality of steps. As such, it is possible to change the widths of the slit and the short pulse, or the modulation degree step by step so as to switch from the second switching pattern to the first switching pattern, thereby curbing vibration due to torque fluctuation that may occur at the time of switching.

In the second aspect, as the control of the second gradual variation when the number of revolutions of the electric motor exceeds a second threshold number of revolutions for switching the second switching pattern to the first switching pattern, the electronic control unit may set the modulation degree to be gradually increased from the modulation degree of the second switching pattern toward the modulation degree of the first switching pattern, and set the widths of the slit and the short pulse by using the set modulation degree and the relationship in which the widths are decreased, as the modulation degree is increased. As such, it is possible to smoothly change the widths of the slit and the short pulse, or the modulation degree so as to switch from the second switching pattern to the first switching pattern, thereby curbing vibration due to torque fluctuation that may occur at the time of switching.

In the second aspect, as the control of the second gradual variation, the electronic control unit may set a voltage phase according to the set modulation degree, and perform switching control of the switching element of the inverter such that the set voltage phase is achieved in the second switching pattern in which the set widths of the slits and the short pulses are used. As such, it is possible to curb torque fluctuation.

In the second aspect, as the control of the second gradual variation when switching from the second switching pattern to the first switching pattern, the electronic control unit may gradually change one or more slits and short pulses, among the slits and the short pulses in the second switching pattern, corresponding to the slit and the short pulse in the first switching pattern such that a timing and the widths of the corresponding slit and the short pulse match the timing and the widths of the slit and the short pulse in the first switching pattern. As such, it is possible to smoothly change the timing of the slit and the short pulse, among the slits and short pulses in the second switching pattern, corresponding to the slit and short pulse in the first switching pattern when switching from the second switching pattern to the first switching pattern, thereby curbing vibration occurring together with torque fluctuation that may occur at the time of switching.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, aspects for implementing the present disclosure will be described with reference to embodiments.

Figure 1:
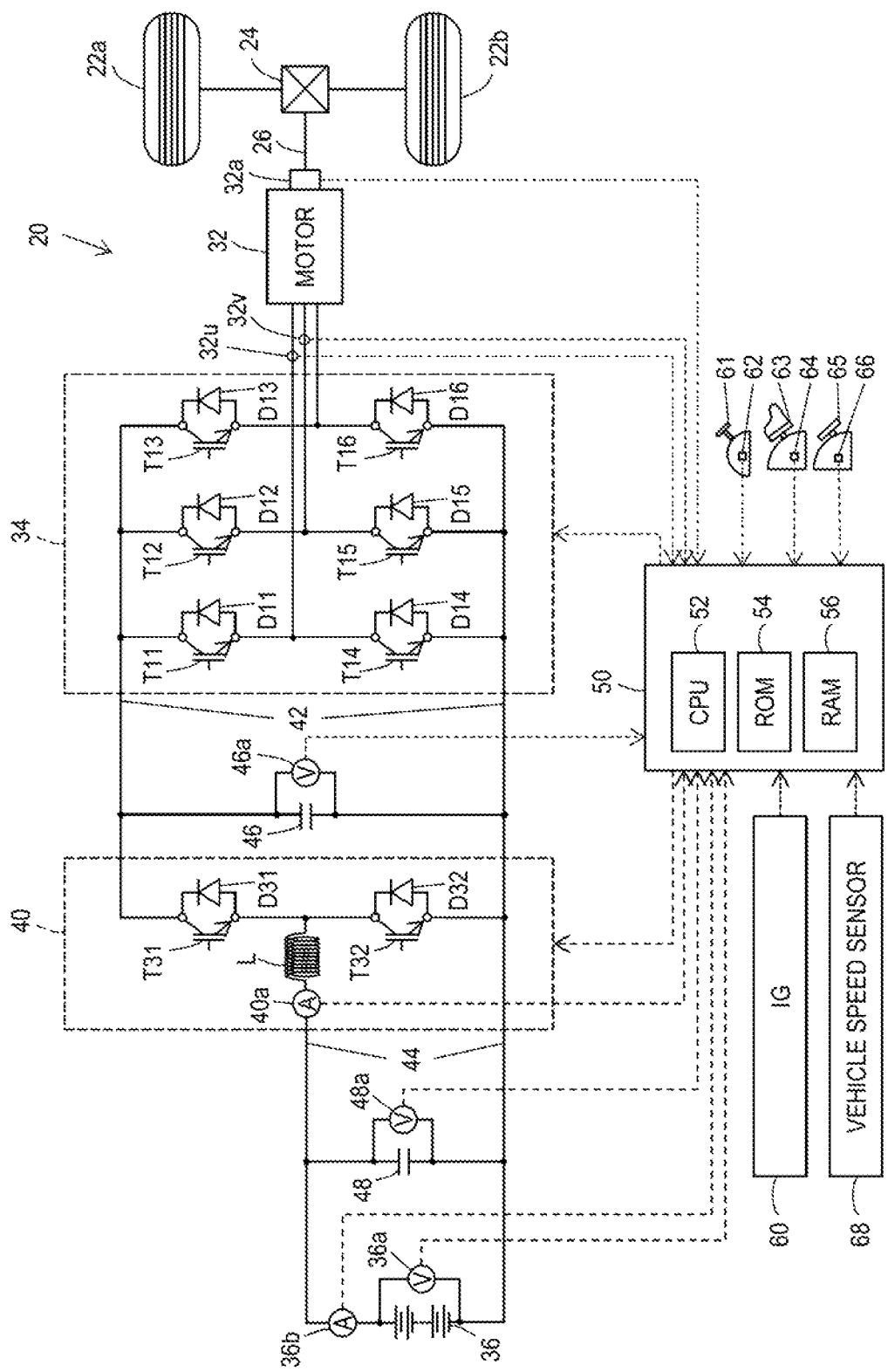
FIG. 1 is a diagram schematically illustrating a configuration of an electric vehicle on which an electric motor control device according to a first embodiment of the present disclosure is mounted.

FIG. 1 is a diagram schematically illustrating a configuration of an electric vehicle 20 on which an electric motor control device according to a first embodiment in the present disclosure is mounted. As illustrated in FIG. 1, the electric vehicle 20 according to the first embodiment includes a motor 32, an inverter 34, a battery 36 as a power source, a boost converter 40, and an electronic control unit 50. The electronic control unit 50 is used as the electric motor control device.

The motor 32 is constituted with a synchronous generating electric motor, and includes a rotor in which a permanent magnet is embedded and a stator around which a three-phase coil is wound. The rotor of the motor 32 is connected to a drive shaft 26 that is coupled to drive wheels 22a, 22b via a differential gear 24.

The inverter 34 is used to drive the motor 32. The inverter 34 is connected to the boost converter 40 via a high-voltage side power line 42, and includes six transistors T11 to T16 as switching elements and six diodes D11 to D16 respectively connected in parallel to the six transistors T11 to T16. The transistors T11 to T16 are arranged in pairs, respectively, so as to be a source and a sink with respect to the positive electrode side line and the negative electrode side line of the high-voltage side power line 42. Furthermore, the connection points between transistors T11 to T16 which form a pair are respectively connected to the three-phase coils (U-phase, V-phase, and W-phase coils) of the motor 32. Therefore, when the voltage is applied to the inverter 34, the electronic control unit 50 adjusts the proportion of the on-time of the transistors T11 to T16 which form the pair such that a rotating magnetic field is formed in the three-phase coil, and the motor 32 is rotationally driven. A smoothing capacitor 46 is attached to the positive electrode side line and the negative electrode side line of the high-voltage side power line 42.

The battery 36 is constituted, for example, with a lithium ion secondary battery or a nickel hydride secondary battery, and is connected to the boost converter 40 via a low-voltage side power line 44. A smoothing capacitor 48 is attached to the positive electrode side line and the negative electrode side line of the low-voltage side power line 44.

The boost converter 40 is connected to the high-voltage side power line 42 and the low-voltage side power line 44, and includes two transistors T31, T32, two diodes D31, D32 respectively connected in parallel to the two transistors T31, T32, and a reactor L. The transistor T31 is connected to the positive side line of the high-voltage side power line 42. The transistor T32 is connected to the transistor T31, and the negative side line of the high-voltage side power line 42 and the low-voltage side power line 44. The reactor L is connected to a connection point between the transistors T31, T32, and the positive electrode side line of the low-voltage side power line 44. As the electronic control unit 50 adjusts the proportion of the on-time of the transistors T31, T32, the boost converter 40 boosts the voltage of the low-voltage side power line 44 and supplies the voltage to the high-voltage side power line 42, or drops the voltage of the high-voltage side power line 42 and supplies the voltage to the low-voltage side power line 44.

The electronic control unit 50 is constituted with a microprocessor having the CPU 52 as a main component, and includes a ROM 54 that stores a processing program, a RAM 56 that temporarily stores data, and input and output ports in addition to the CPU 52. Signals from various sensors are input to the electronic control unit 50 through the input port. Examples of a signal input to the electronic control unit 50 may include a rotation position $\theta_m$ from a rotation position detection sensor 32a (for example, a resolver) that detects a rotation position of the rotor of the motor 32, phase currents $I_u$, $I_v$ from current sensors 32u, 32v that detect the phase current of each phase of the motor 32, voltage $V_b$ from a voltage sensor 36a attached between terminals of the battery 36, a current $I_b$ from a current sensor 36b attached to the output terminal of the battery 36, a current $I_L$ from a current sensor 40a attached in series to the reactor L, voltage $V_H$ of a capacitor 46 (the high-voltage side power line 42) from a voltage sensor 46a attached between terminals of the capacitor 46, voltage $V_L$ of the capacitor 48 (the low-voltage side power line 44) from a voltage sensor 48a attached between terminals of the capacitor 48, an ignition signal from an ignition switch 60, a shift position SP from a shift position sensor 62 that detects an operation position of a shift lever 61, an accelerator opening degree $A_{cc}$ from an accelerator pedal position sensor 64 that detects a depression amount of an accelerator pedal 63, a brake pedal position BP from a brake pedal position sensor 66 that detects a depression amount of a brake pedal 65, and vehicle speed V from a vehicle speed sensor 68. The electronic control unit 50 calculates the number of revolutions $N_m$ of the motor 32 based on the rotation position $\theta_m$ from the rotation position detection sensor 32a, or a state of charge SOC of the battery 36 based on an integrated value of the current $I_b$ of the battery 36 from the current sensor 36b. Here, the state of charge SOC is a rate of the amount of power (dischargeable power amount) stored in the battery 36 relative to the total capacity of the battery 36.

Various control signals are output from the electronic control unit 50 through the output port. Examples of a signal output from the electronic control unit 50 may include a switching control signal to the transistors T11 to T16 of the inverter 34, and a switching control signal to the transistors T31, T32 of the boost converter 40.

In the electric vehicle 20 according to the present embodiment, configured in the above manner, the electronic control unit 50 performs the following traveling control. In the traveling control, requirement torque $T_d^*$, required for the drive shaft 26, is set based on the accelerator opening degree $A_{cc}$ and the vehicle speed V, the set requirement torque $T_{d*}$ is set as a torque command $T_m^*$ of the motor 32, and switching control of the transistors T11 to T16 of the inverter 34 is performed so that the motor 32 can be driven by the torque command $T_m^*$. Further, in the traveling control, a target voltage $V_H^*$ of the high-voltage side power line 42 is set so that the motor 32 can be driven by the torque command $T_m^*$, and switch control of the transistors T31, T32 of the boost converter 40 is performed so that the voltage $V_H$ of the high-voltage side power line 42 can reach the target voltage $V_H^*$.

Figure 2:
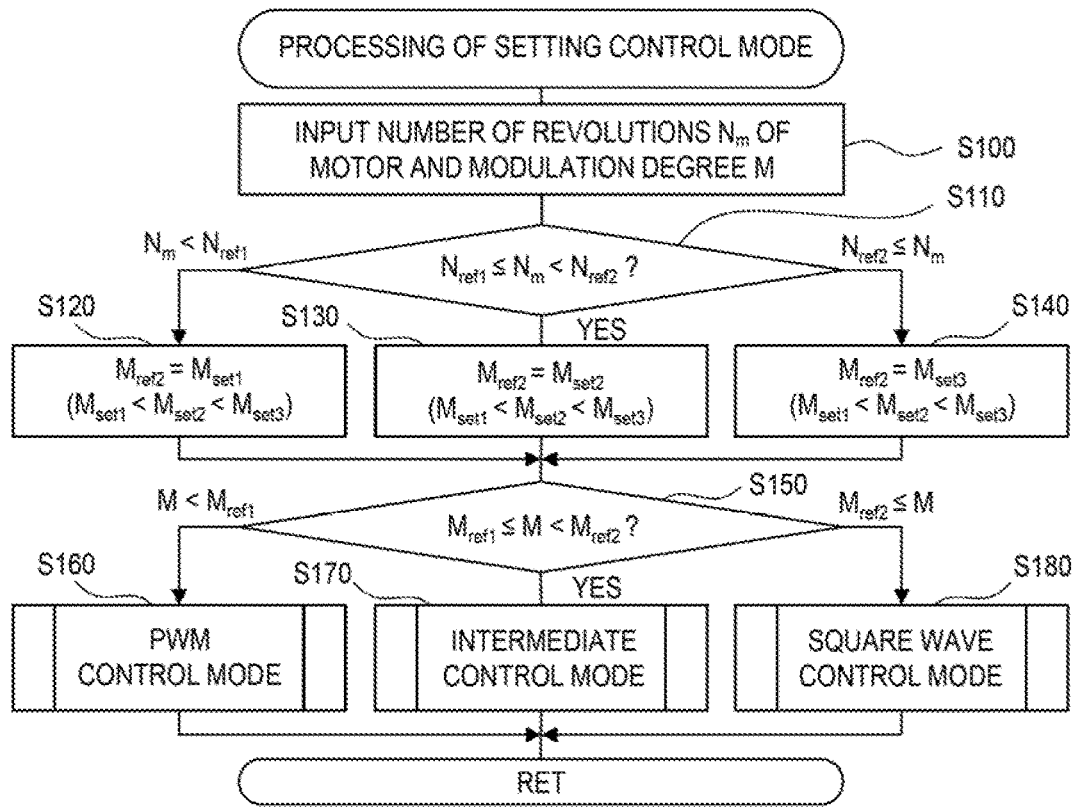
FIG. 2 is a flowchart illustrating an example of the processing of setting control mode, performed by an electronic control unit.

Next, control in the control device, mounted on the electric vehicle 20 according to the first embodiment, particularly, switching control of the switching element of the inverter 34 will be described. FIG. 2 is a flowchart illustrating an example of the processing of setting control mode, performed by the electronic control unit 50. The processing is repeatedly performed at every predetermined time.

When the processing of setting the control mode is performed, the electronic control unit 50 first performs processing of inputting the number of revolutions $N_m$ of the motor 32 and the modulation degree M (step S100). As the number of revolutions $N_m$ of the motor 32, a value calculated based on the rotation position $\theta_m$ from the rotation position detection sensor 32a can be input. The modulation degree M can be obtained by dividing a square root of the sum of squares of a d-axis component $V_d$ and a q-axis component $V_q$ in the voltage vector by the voltage $V_H$ of the high-voltage power line 42.

Subsequently, the input number of revolutions $N_m$ of the motor 32 is compared with a threshold value $N_{ref1}$ and a threshold value $N_{ref2}$ (step S110). Details of the threshold value $N_{ref1}$ and the threshold value $N_{ref2}$ will be described below. When the number of revolutions $N_m$ of the motor 32 is less than the threshold value $Nr_{ref1}$, a value $M_{set1}$ is set to the threshold value $M_{ref2}$ (step S120). When the number of revolutions $N_m$ of the motor 32 is greater than or equal to the threshold value $N_{ref1}$ and less than the threshold value $N_{ref2}$, a value $M_{set2}$ is set to the threshold value $M_{ref2}$ (step S130). When the number of revolutions $N_m$ of the motor 32 is greater than or equal to the threshold value $N_{ref2}$, a value $M_{set3}$ is set to the threshold value $M_{ref2}$ (step S140). The threshold value $M_{ref2}$, the value $M_{set1}$, the value $M_{set2}$, and the value $M_{set3}$ will be described below.

Figure 3:
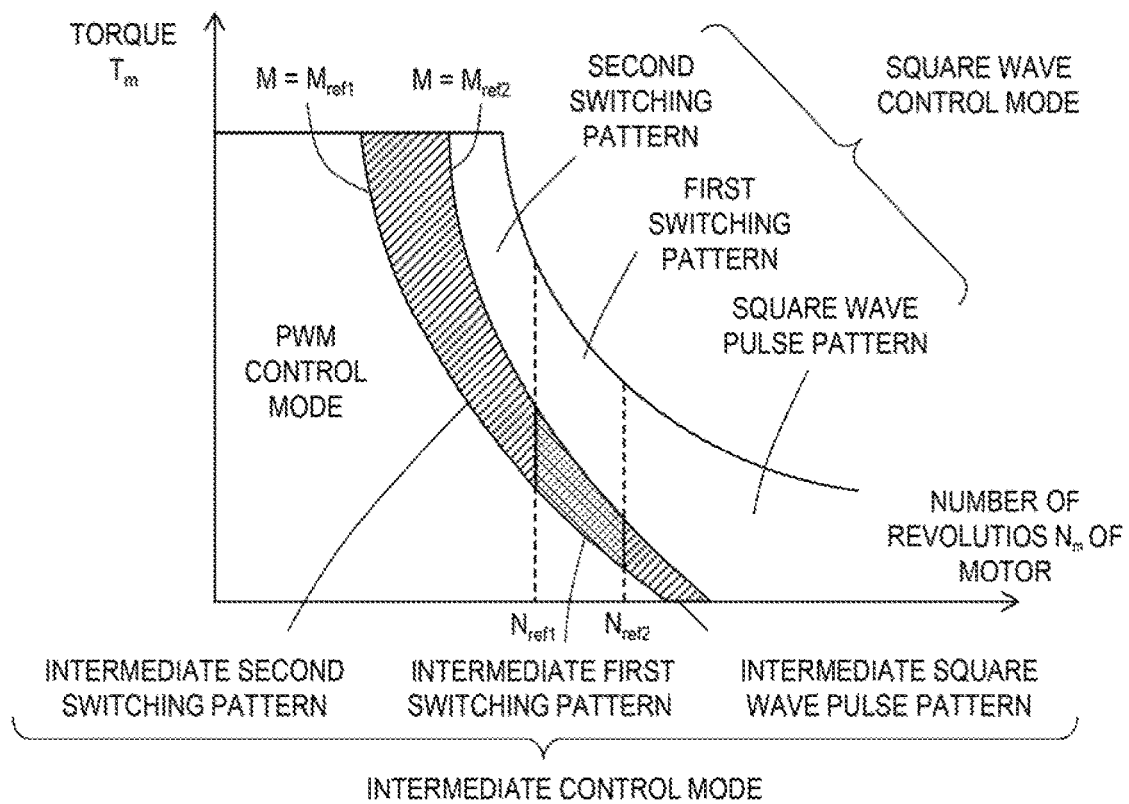
FIG. 3 is a diagram illustrating an example of the relationship between number of revolutions of a motor, torque, and control mode.

Next, the modulation degree M is compared with the threshold value $M_{ref1}$ and the threshold value $M_{ref2}$ (step S150). When it is determined that the modulation degree M is less than the threshold value $M_{ref1}$, the PWM control mode is set (step S160). When it is determined that the modulation degree M is greater than or equal to the threshold value $M_{ref1}$ and less than the threshold value $M_{ref2}$, the intermediate control mode is set (step S170). When it is determined that the modulation degree M is greater than or equal to the threshold value $M_{ref2}$, the square wave control mode is set (step S180). Then, the processing ends. The threshold value $M_{ref1}$ is a modulation degree that distinguishes the pulse width modulation control mode (hereinafter, referred to as the PWM control mode) from the intermediate control mode. The threshold value $M_{ref2}$ is a modulation degree that distinguishes the intermediate control mode from the square wave control mode. The PWM control mode controls the inverter 34 so that a pseudo three-phase alternate current voltage is applied (supplied) to the motor 32. The square wave control mode controls the inverter 34 so that square wave voltage is applied to the motor 32. The intermediate control mode controls the inverter 34 so that the voltage of the pulse pattern in which a slit or a short pulse is formed in the pulse pattern in the square wave control mode at the time of zero-cross when the phase current crosses zero can be applied to the motor 32. Details of the intermediate control mode will be described below. FIG. 3 illustrates an example of the relationship between the number of revolutions $N_m$ of the motor 32, torque $T_m$, and control mode. In the figure, the lower left area represents the PWM control mode, the hatched area represents the intermediate control mode, and the upper right area represents the square wave control mode.

The control in the PWM control mode uses a pulse pattern formed by a well-known pulse width modulation. Since the PWM control mode does not form the core of the present disclosure, detailed description thereof is omitted. Moreover, for convenience of description, the pulse pattern in the square wave control mode will be described first, and then the pulse pattern in the intermediate control mode will be described.

Figure 4:
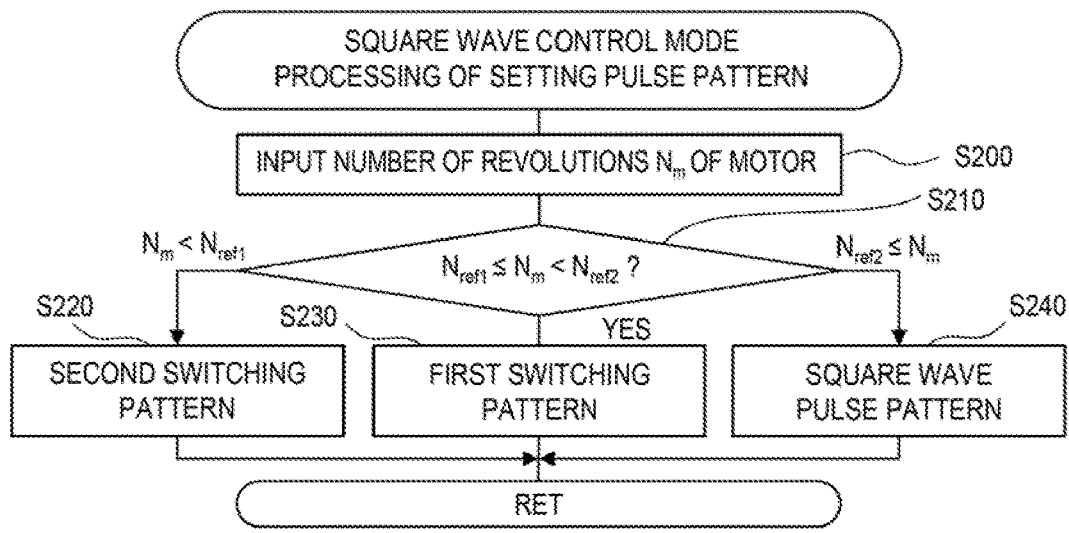
FIG. 4 is a flowchart illustrating an example of the processing of setting a square wave control mode pulse pattern, performed by the electronic control unit.

In the control device mounted on the electric vehicle 20 according to the first embodiment, the square wave control mode controls the inverter 34 by three pulse patterns, which are the first switching pattern, the second switching pattern, and the square wave pulse pattern. FIG. 4 is a flowchart illustrating an example of processing of setting square wave control mode pulse pattern, performed by the electronic control unit 50. In the processing of setting the square wave control mode pulse pattern, first, the number of revolutions $N_m$ of the motor 32 is input (step S200), and the input number of revolutions $N_m$ of the motor 32 is compared with the threshold value $N_{ref1}$ and the threshold value $N_{ref2}$ (step S210). The threshold value $N_{ref2}$ is the number of revolutions greater than the upper limit value of a first resonance region obtained by converting, into the number of revolutions of the motor 32, the region in which LC resonance occurs due to sixth electric fluctuation frequency of the motor 32. In addition, the threshold value $N_{ref1}$ is the number of revolutions less than the lower limit value of the first resonance region and greater than the upper limit value of a second resonance region obtained by converting, into the number of revolutions of the motor 32, the region in which LC resonance occurs due to twelfth electric fluctuation frequency of the motor 32. When it is determined that the number of revolutions $N_m$ of the motor 32 is less than the threshold value $N_{ref1}$, the second switching pattern is set (step S220). When it is determined that the number of revolutions $N_m$ of the motor 32 is greater than or equal to the threshold value $N_{ref1}$ and less than the threshold value $N_{ref2}$, the first switching pattern is set (step S230). When it is determined that the number of revolutions $N_m$ of the motor 32 is greater than or equal to the threshold value $N_{ref2}$, the square wave pulse pattern is set (step S240). Then, the processing ends.

Figure 5:
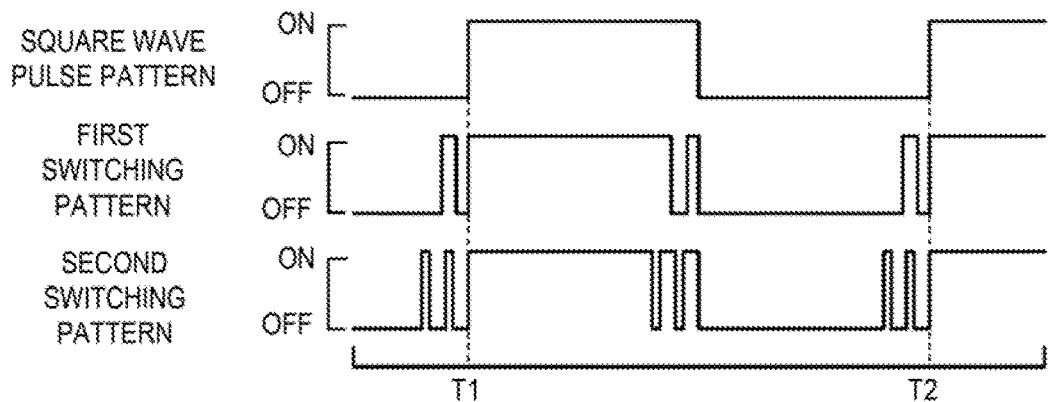
FIG. 5 is a diagram illustrating an example of a square pulse pattern, a first switching pattern, and a second switching pattern.

FIG. 5 is a diagram illustrating an example of the square wave pulse pattern, the first switching pattern, and the second switching pattern. As illustrated in the figure, the square wave pulse pattern is a pulse pattern (a pulse pattern in a normal square wave control) in which the entire first half of one period from time T1 to T2 becomes one pulse (the square wave pulse) and no pulse is formed in the second half of the period. In the first switching pattern, one slit is formed in a region where the square wave pulse of the square wave pulse pattern in the first half of one period T1 to T2 is present, one short pulse is formed at the same time when the slit is formed in the second half of the period, and the sixth electric fluctuation frequency component is made higher. As illustrated in the figure, as a switching pattern in which the sixth electric fluctuation frequency component is made higher, a pulse pattern having four or more pulses in one period as well as a pulse pattern having three pulses in one period is effective. However, in the first embodiment, the pulse pattern having the smallest number of pulses in one period is used as the first switching pattern. The second switching pattern is a pulse pattern in which one slit (two slits in total) and one short pulse (two short pulses in total) are additionally formed in the first switching pattern, and an twelfth electric fluctuation component is made higher in addition to the sixth electric fluctuation frequency component. As illustrated FIG. 5, as a switching pattern in which the twelfth electric fluctuation frequency component is made higher in addition to the sixth electric fluctuation frequency component, a pulse pattern having five or more pulses in one period as well as a pulse pattern having four pulses in one period is effective. However, in the first embodiment, the pattern having the smallest number of pulses in one period is used as the second switching pattern. In the square wave control mode in the upper right region in FIG. 3 as well, the regions divided by the threshold value $N_{ref1}$ and the threshold value $N_{ref2}$, in order from the left, represent the second switching pattern, the first switching pattern, and the square wave pulse pattern, respectively.

As described above, in the processing of setting the square wave control mode pulse pattern, in step S210, when it is determined that the number of revolutions $N_m$ of the motor 32 is less than the threshold value $N_{ref1}$, the second switching pattern is set in order to curb LC resonance due to the twelfth electric fluctuation frequency of the motor 32. When it is determined that the number of revolutions $N_m$ of the motor 32 is greater than or equal to the threshold value $N_{ref1}$ and less than the threshold value $N_{ref2}$, the first switching pattern is set in order to curb LC resonance due to the sixth electric fluctuation frequency. When it is determined that the number of revolutions $N_m$ of the motor 32 is greater than or equal to the threshold value $N_{ref2}$, the square wave pulse pattern is set because LC resonance does not occur. As such, it is possible to curb vibration which may occur due to LC resonance caused by the sixth electric fluctuation frequency or the twelfth electric fluctuation frequency.

Here, the meaning of the value M the value $M_{set1}$, and the value $M_{set2}$, and the value $M_{set3}$ set as the threshold value $M_{ref2}$ in steps S110 to S140 in FIG. 2 will be described. In the square wave control mode, the value $M_{set1}$ is the modulation degree when the second switching pattern is used (the value is 0.75 in the first embodiment). The value $M_{set2}$ is the modulation degree when the first switching pattern is used, and greater than the value $M_{set1}$ (the value is 0.756 in the first embodiment). The value $M_{set3}$ is the modulation degree when the square wave pulse pattern is used, and greater than the value $M_{set2}$ (the value is 0.78 in the first embodiment). As illustrated in FIG. 3, the modulation degree in the square wave control mode is used as the threshold value $M_{ref2}$, which is the upper limit value of the modulation degree M in the intermediate control mode. Thus, in a case where the number of revolutions $N_m$ of the motor 32 is less than the threshold value $N_{ref1}$, the $M_{ref2}$ becomes the modulation degree (the value $M_{set1}$) when the second switching pattern is used. In a case where the number of revolutions Nm of the motor 32 is greater than or equal to the threshold value $N_{ref1}$ and less than the threshold value $N_{ref2}$, the $M_{ref2}$ becomes the modulation degree (the value $M_{set2}$) when the first switching pattern is used. In a case where the number of revolutions $N_m$ of the motor 32 is greater than or equal to the $N_{ref2}$, the $M_{ref2}$ becomes the modulation degree (the value $M_{set3}$) when the square wave pulse pattern is used. In the processing of steps S110 to S140 in the processing of setting the control mode in FIG. 2, the threshold value $M_{ref2}$ is set in consideration of the above situations.

Figure 6:
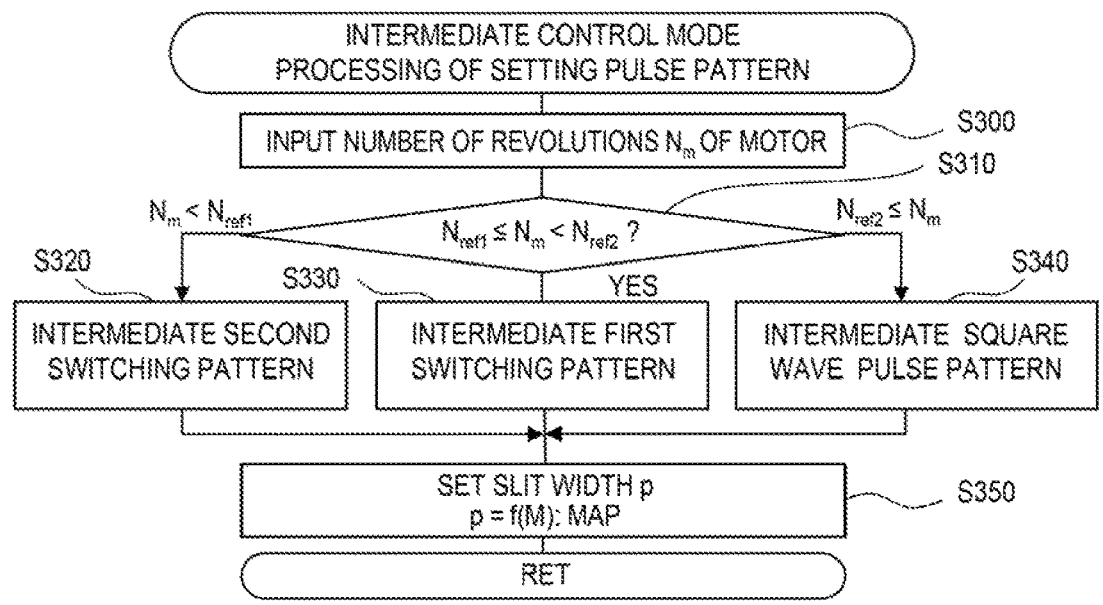
FIG. 6 is a flowchart illustrating an example of the processing of setting intermediate control mode pulse pattern, performed by the electronic control unit.
Figure 7:
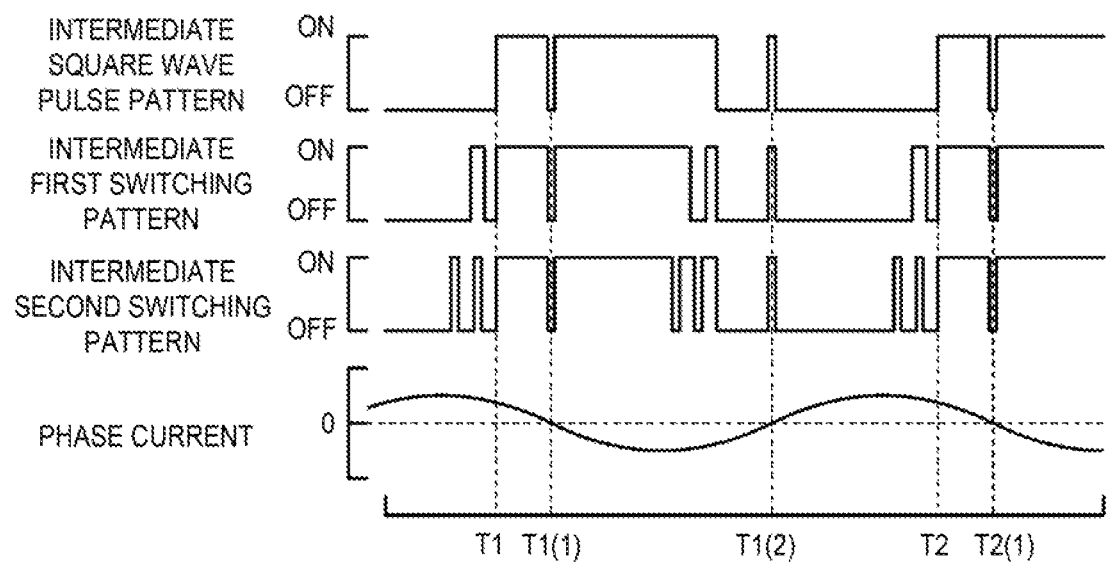
FIG. 7 is a diagram illustrating an example of an intermediate square pulse pattern, an intermediate first switching pattern, and an intermediate second switching pattern.

Next, the pulse pattern in the intermediate control mode will be described. FIG. 6 is a flowchart illustrating an example of the processing of setting the intermediate control mode pulse pattern, performed by the electronic control unit 50. In the processing of setting the intermediate control mode pulse pattern, first, the number of revolutions $N_m$ of the motor 32 is input (step S300), and the input number of revolutions $N_m$ of the motor 32 is compared with the threshold value $N_{ref1}$ and the threshold value $N_{ref2}$ (step S310). When it is determined that the number of revolutions $N_m$ of the motor 32 is less than the threshold value $N_{ref1}$, the intermediate second switching pattern is set (step S320). When it is determined that the number of revolutions $N_m$ of the motor 32 is greater than or equal to the threshold value $N_{ref1}$ and less than the threshold value $N_{ref2}$, the intermediate first switching pattern is set (step S330). When it is determined that the number of revolutions $N_m$ of the motor 32 is greater than or equal to the threshold value $N_{ref2}$, the intermediate square wave pulse pattern is set (step S340). Examples of the intermediate square wave pulse pattern, the intermediate first switching pattern, and the intermediate second switching pattern are illustrated in FIG. 7. In the square wave pulse pattern (see FIG. 5), the intermediate square wave pulse pattern is a pulse pattern in which a slit is formed in the square wave pulse at the time of zero-cross T1(1), when the phase current crosses the value zero in the first half of one period from times T1 to T2, and a short pulse having the same width as the slit is formed at the time of zero-cross T1(2) in the second half of the period. In other words, with respect to the square wave pulse pattern, the intermediate square wave pulse pattern becomes a switching pattern in which a slit is formed in a case where a pulse is present at the time when the phase current crosses the value zero, and a short pulse having the same width as the slit is formed in a case where a pulse is not present at that time. In a similar manner to the intermediate square wave pulse pattern, with respect to the first switching pattern and the second switching pattern (see FIG. 5), the intermediate first switching pattern and the intermediate second switching pattern are pulse patterns in each of which a slit is formed in the square wave pulse at the time of zero-cross T1(1) in the first half of the period, and a short pulse having the same width as the slit is formed at the time of zero-cross T1(2) in the second half of the period. In other words, with respect to the first switching pattern and the second switching pattern, the intermediate first switching pattern and the intermediate second switching pattern become switching patterns in each of which a slit is formed in a case where a pulse is present at the time when the phase current crosses the value zero, and a short pulse having the same width as the slit is formed in a case where a pulse is not present at that time. In addition, in the intermediate control mode, that is the hatched area in FIG. 3, the regions divided by the threshold value $N_{ref1}$ and the threshold value $N_{ref2}$, in order from the left, represent the intermediate second switching pattern, the intermediate first switching pattern, and the intermediate square wave pulse pattern, respectively.

Figure 8:
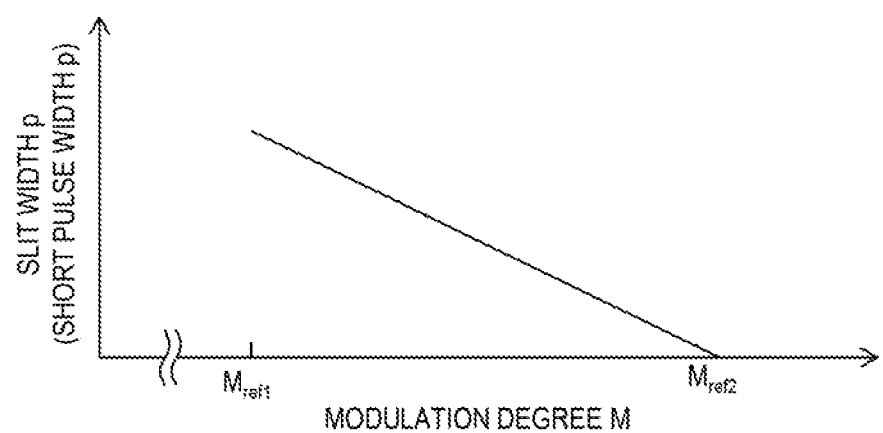
FIG. 8 is a diagram illustrating an example of a slit width setting map.

Then, a slit width p is set based on the modulation degree M (step S350), and the processing is ended. As described above, since the short pulse the slit has the same width, setting the slit width p in step S350 means setting the short pulse width p. In the present embodiment, the relationship between the pulse width p and the modulation degree M, obtained by experiments, or the like, is stored in advance as a slit width setting map so that the modulation degree M changes from the threshold value $M_{ref1}$ to the threshold value $M_{ref2}$ in each pulse pattern, and the slit width p is set by deriving the corresponding slit width from the map when the modulation degree M is given. An example of the slit width setting map is illustrated in FIG. 8. As illustrated in the figure, the slit width p is decreased as the modulation degree M is increased, and becomes zero when the modulation degree M reaches the threshold value $M_{ref2}$. In other words, since the intermediate control mode is switched to the square wave control mode when the modulation degree M reaches the threshold value $M_{ref2}$, the intermediate square wave pulse pattern, the intermediate first switching pattern, and the intermediate second switching pattern are switched to the square wave pulse pattern, the first switching pattern, and the second switching pattern. Here, the slit width p is gradually decreased and becomes the value zero as the modulation degree M is increased, and thus torque fluctuation does not occur when the intermediate control mode is switched to the square wave control mode. In addition, it is considered that a slit or a short pulse is formed at the when the phase current crosses zero in order to reduce an influence of the phase current on a waveform.

In the control device mounted on the electric vehicle 20 according to the first embodiment described above, when the modulation degree M is greater than or equal to the threshold value $M_{ref1}$ and less than the threshold value $M_{ref2}$, in the intermediate control mode, a switching pattern is set in which, in the pulse pattern in the square wave control mode, a slit is formed in a case where a pulse is present at the time when the phase current crosses the value zero, and a short pulse having the same width as the slit is formed in a case where a pulse is not present at that time. Thereafter, the slit width p (short pulse width p) is set using the slit width setting map in which the slit width p is gradually decreased as the modulation degree M is increased, and becomes the value zero when the modulation degree M reaches $M_{ref2}$. Then, switching control of the switching element of the inverter is performed by the obtained switching pattern. As such, since the modulation degree M gradually changes from the threshold value $M_{ref1}$ to the threshold value $M_{ref2}$, it is possible to curb vibration due to torque fluctuation caused by a sudden change in the modulation degree M.

In addition, in the control device mounted on the electric vehicle 20 according to the first embodiment, in the intermediate control mode, in a region in which the number of revolutions $N_m$ of the motor 32 is greater than or equal to the threshold value $N_{ref1}$ and less than the threshold value $N_{ref2}$ and LC resonance due to the sixth electric fluctuation frequency of the motor 32 may occur, the intermediate first switching pattern is set in which a slit is formed in a case where a pulse is present at the time when the phase current crosses the value zero, and a short pulse having the same width as the slit is formed in a case where a pulse is not present at that time with respect to the first switching pattern in which the sixth electric fluctuation frequency is made higher. As such, it is possible to curb vibration that may occur due to LC resonance caused by the sixth electric fluctuation frequency. Furthermore, in the intermediate control mode, in a region in which the number of revolutions $N_m$ of the motor 32 is less than the threshold value $N_{ref1}$ and LC resonance due to the twelfth electric fluctuation frequency of the motor 32 may occur, the intermediate first switching pattern is set in which a slit is formed in a case where a pulse is present at the time when the phase current crosses the value zero, and a short pulse having the same width as the slit is formed in a case where a pulse is not present at that time with respect to the second switching pattern in which the twelfth electric fluctuation frequency is made higher as well as the sixth electric fluctuation frequency. As such, it is possible to curb vibration that may occur due to LC resonance caused by the twelfth electric fluctuation frequency.

Figure 9:
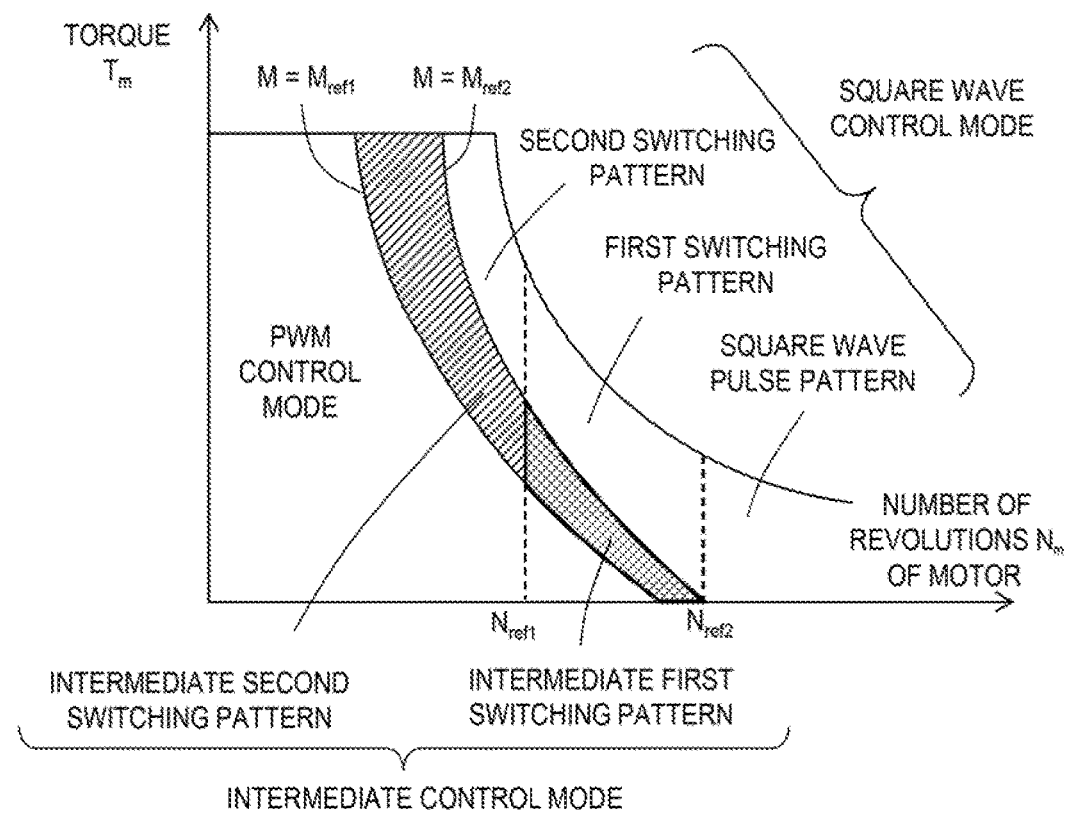
FIG. 9 is a diagram illustrating an example of the relationship between the number of revolutions of the motor, the torque, and the control mode in a modified example.

In the control device mounted on the electric vehicle 20 according to the first embodiment, the intermediate control mode has the intermediate second switching pattern, the intermediate first switching pattern, and the intermediate square wave pulse pattern. However, as illustrated in the relationship between the number of revolutions $N_m$ of the motor 32, the torque $T_m$, and the control mode of a modified example in FIG. 9, the intermediate control mode may have the intermediate second switching pattern and the intermediate first switching pattern, but does not have to have the intermediate square wave pulse pattern. As described above, in the intermediate control mode, considering that the occurrence of LC resonance due to the sixth electric fluctuation frequency or the twelfth electric fluctuation frequency is curbed, the intermediate control mode can have a region of up to a threshold value $N_{ref2}$ that is greater than the upper limit value of a region in which LC resonance due to the sixth electric fluctuation frequency occurs. In this case, the processing of setting the control mode in FIG. 10 is performed instead of the processing of setting the control mode in FIG. 2, and the intermediate control mode pulse pattern in FIG. 11 is performed instead of the processing of setting the intermediate control mode pulse pattern in FIG. 6.

Figure 10:
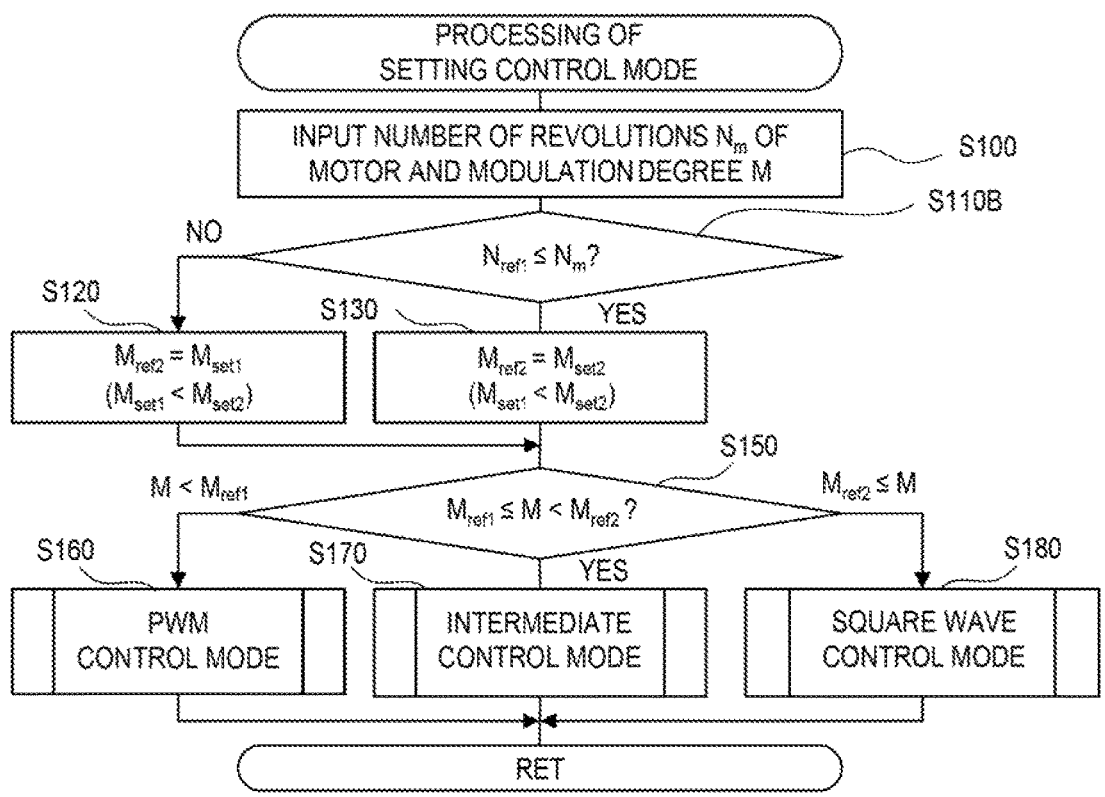
FIG. 10 is a flowchart illustrating an example of the processing of setting the control mode in the modified example.

In the processing of setting the control mode in FIG. 10, the number of revolutions $N_m$ of the motor 32 and the modulation degree M are input (step S100), and it is determined whether the number of revolutions $N_m$ of the motor 32 is greater than or equal to the threshold value $N_{ref1}$ (step S110B). When it is determined that the number of revolutions $N_m$ of the motor 32 is less than the threshold value $N_{ref1}$, the value $M_{set1}$ is set to the threshold value $M_{ref2}$ (step S120). When it is determined that the number of revolutions $N_m$ of the motor 32 is greater than or equal to the threshold value $N_{ref1}$, the value $M_{set2}$ is set to the threshold value $M_{ref2}$ (step S130). Then, the modulation degree M is compared with the threshold value $M_{ref1}$ and the threshold value $M_{ref2}$ (step S150). When it is determined that the modulation degree M is less than the threshold value $M_{ref1}$, the PWM control mode is set (step S160). When it is determined that the modulation degree M is greater than or equal to the threshold value $M_{ref1}$ and less than the threshold value $M_{ref2}$, the intermediate control mode is set (step S170). When it is determined that the modulation degree M is greater than or equal to the threshold value $M_{ref2}$, the square wave control mode is set (step S180). Then, the processing is ended. In other words, the processing in which step S140 is deleted from the processing of setting the control mode in FIG. 2 is performed.

Figure 11:
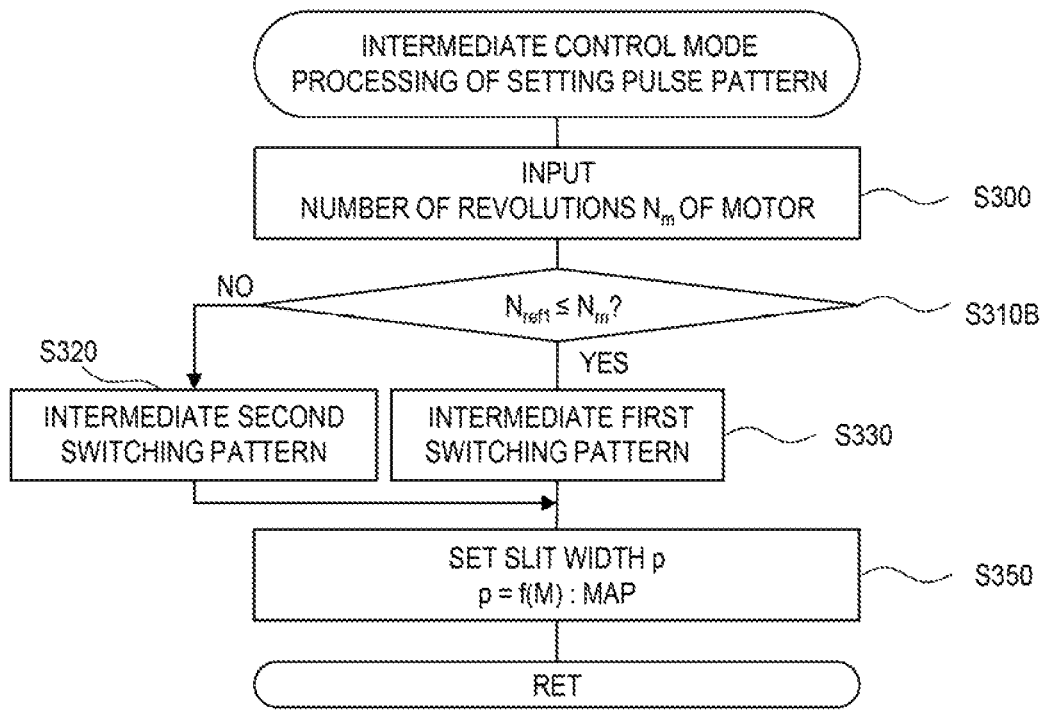
FIG. 11 is a flowchart illustrating an example of the processing of setting the intermediate control mode pulse pattern in the modified example.

In the processing of setting the intermediate control mode pulse pattern in FIG. 11, the number of revolutions $N_m$ of the motor 32 is input (step S300), and it is determined whether the number of revolutions $N_m$ of the motor 32 is greater than or equal to the threshold value $N_{ref1}$ (step S310B). When it is determined that the number of revolutions $N_m$ of the motor 32 is less than the threshold value $N_{ref1}$, the intermediate second switching pattern is set (step S320). When it is determined that the number of revolutions $N_m$ of the motor 32 is greater than or equal to the threshold value $N_{ref1}$, the intermediate first switching pattern is set (step S330). Then, the slit width p is set based on the modulation degree M (step S350), and the processing is ended. In other words, the processing in which step S340 is deleted from the processing of setting the control mode in FIG. 6 is performed.

Even the control device mounted on the electric vehicle of the modified example can have the same effect as that achieved by the control device mounted on the electric vehicle 20 according to the first embodiment.

Figure 12:
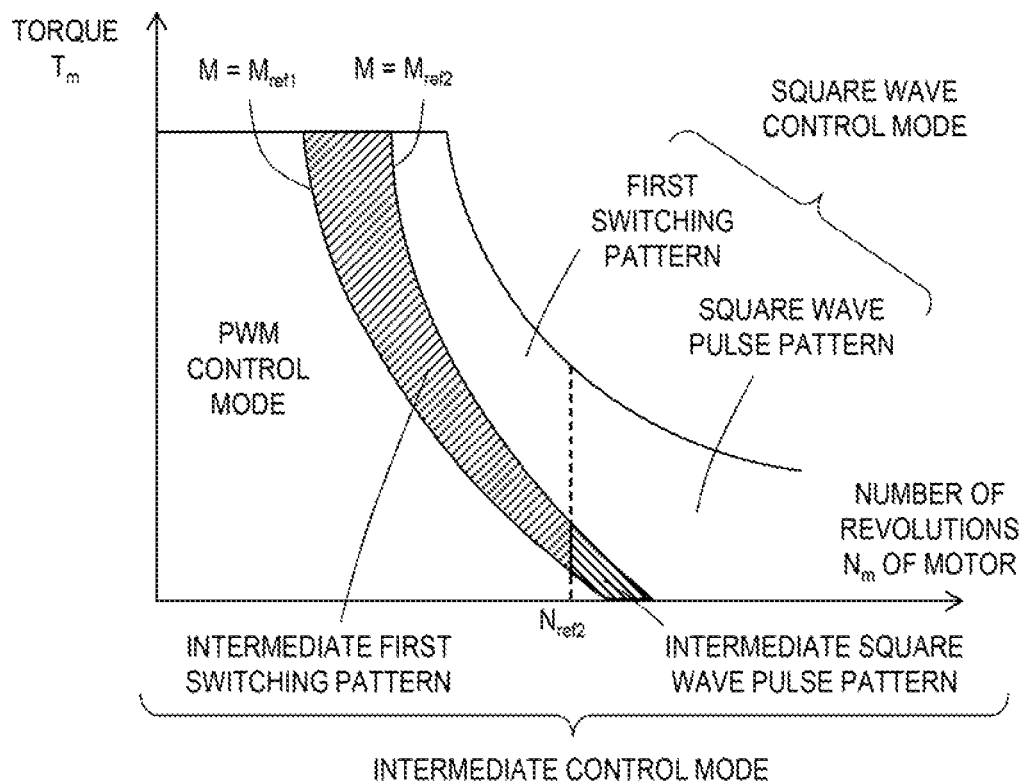
FIG. 12 is a diagram describing the example of the relationship between the number of revolutions of the motor, the torque, and the control mode in the modified example.
Figure 13:
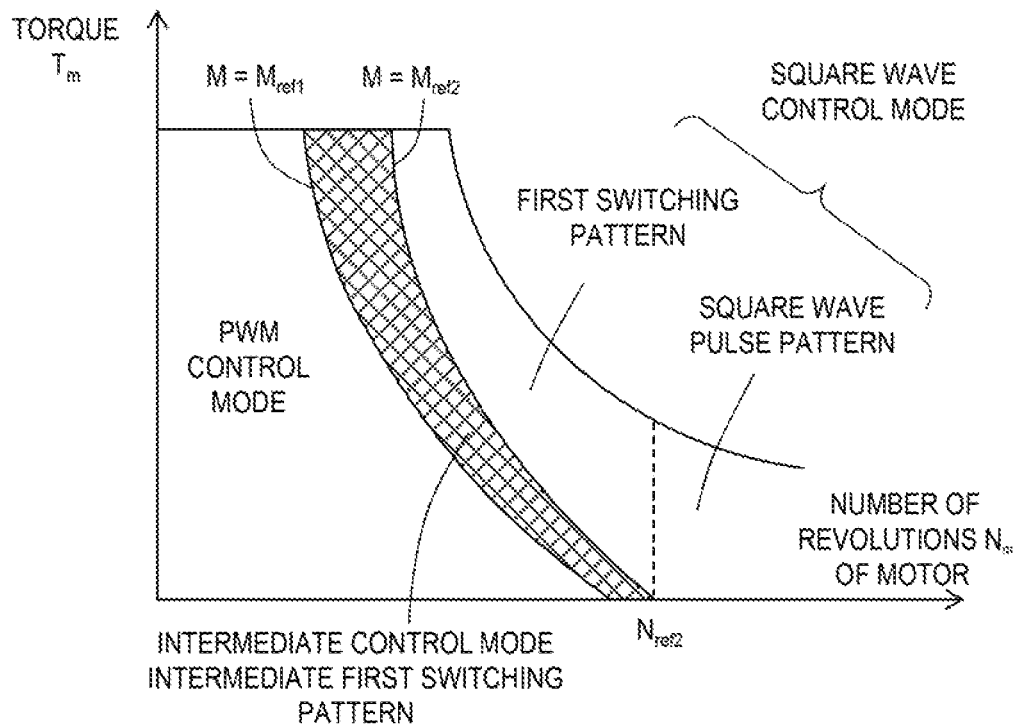
FIG. 13 is a diagram describing the example of the relationship between the number of revolutions of the motor, the torque, and the control mode in the modified example.

Further, as in the relationship between the number of revolutions $N_m$ of the motor 32, the torque $T_m$, and the control mode of the modified example illustrated in FIGS. 12 and 13, the square wave control mode may have the square wave pulse pattern and the first switching pattern but does not have to have the second switching pattern. In this case, as the processing of setting the control mode, a processing is performed in which step S110 in the processing of setting the control mode in FIG. 2 is changed to processing of determining whether the number of revolutions $N_m$ of the motor 32 is greater than or equal to the threshold value $N_{ref2}$ and step S120 is deleted, or in which steps S110B and S120 in the processing of setting the control mode in FIG. 10 are deleted. Furthermore, as the processing of setting the intermediate control mode pulse pattern, a processing is performed in which step S310 in the processing of setting the intermediate control mode pulse pattern in FIG. 6 is changed to the processing of determining whether the number of revolutions $N_m$ of the motor 32 is greater than or equal to the threshold value $N_{ref2}$ and step S320 is deleted, or in which steps S310B and S320 in the processing of setting the intermediate control mode pulse pattern in FIG. 11 are deleted. In this case, it is also possible to curb vibration due to torque fluctuation caused by a sudden change in the modulation degree M, and vibration that may occur due to LC resonance caused by the sixth electric fluctuation frequency.

Figure 14:
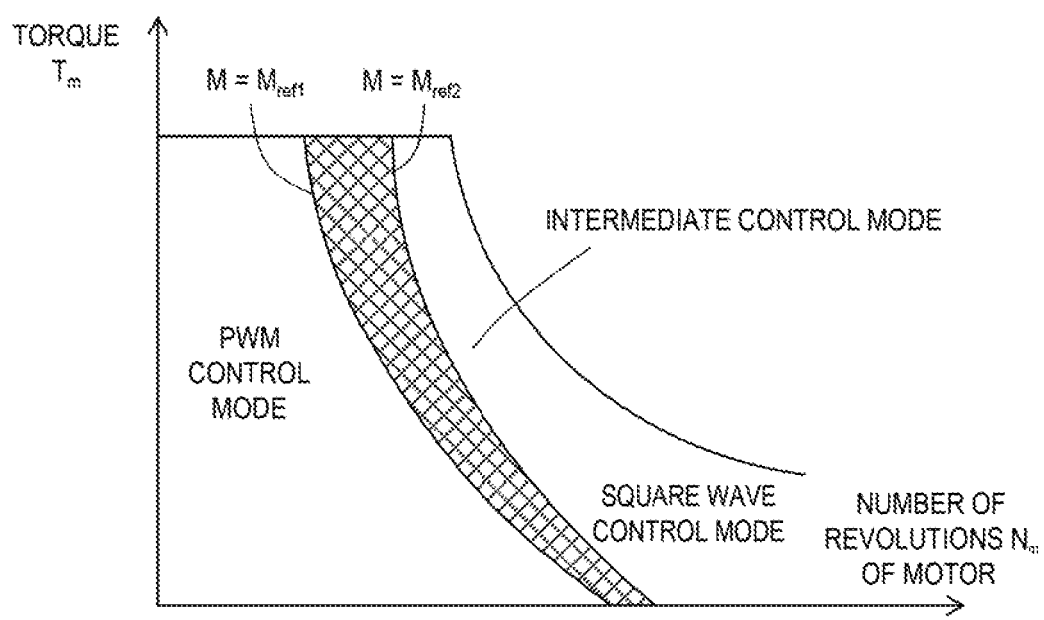
FIG. 14 is a diagram describing the example of the relationship between the number of revolutions of the motor, the torque, and the control mode in the modified example.

Furthermore, as in the relationship between the number of revolutions $N_m$ of the motor 32, the torque $T_m$, and the control mode of the modified example illustrated in FIG. 14, the square wave control mode may only have the square wave pulse pattern. In this case, as in the processing of setting the control mode, a processing is performed in which steps S110 to S140 in the processing of setting the control mode in FIG. 2 are deleted, and as in the processing of setting the intermediate control mode pulse pattern, a processing is performed in which steps S310 to S330 in the processing of setting the intermediate control mode pulse pattern in FIG. 6 are deleted. In this case, it is also possible to curb vibration due to torque fluctuation caused by a sudden change in the modulation degree M.

Next, a control device mounted on the electric vehicle 120 according to the second embodiment will be described. The electric vehicle 120 according to the second embodiment has the same configuration as the electric vehicle 20 according to the first embodiment illustrated in FIG. 1. Therefore, in order to avoid an overlapping description, the configuration of the electric vehicle 120 according to the second embodiment is denoted by the same reference numeral as the configuration of the electric vehicle 20 according to the first embodiment illustrated in FIG. 1, and description thereof will be omitted. In a similar manner to the electric vehicle 20 according to the first embodiment, the control device mounted on the electric vehicle 120 according to the second embodiment also has the PWM control mode, the intermediate control mode, and the square wave control mode as illustrated in the relationship between the number of revolutions $N_m$ of the motor 32, the torque $T_m$, and the control mode in FIG. 2. Therefore, the processing of setting the control mode in FIG. 2 is performed. In addition, in a similar manner to the electric vehicle 20 according to the first embodiment, in the control device mounted on the electric vehicle 120 according to the second embodiment, in the square wave control mode, the second switching pattern is used when the number of revolutions $N_m$ of the motor 32 is less than the threshold value $N_{ref1}$, the first switching pattern is used when the number of revolutions $N_m$ of the motor 32 is greater than or equal to the threshold value $N_{ref1}$ and less than the threshold value $N_{ref2}$, and the square wave pulse pattern is used when the number of revolutions $N_m$ of the motor 32 is greater than or equal to the threshold value $N_{ref2}$. In other words, the processing of setting the square wave control mode pulse pattern in FIG. 4 is also performed. Further, in a similar manner to the electric vehicle 20 according to the first embodiment, in the control device mounted on the electric vehicle 120 according to the second embodiment, in the intermediate control mode, the intermediate second switching pattern is used when the number of revolutions $N_m$ of the motor 32 is less than the threshold value $N_{ref1}$, the intermediate first switching pattern is used when the number of revolutions $N_m$ of the motor 32 is greater than or equal to the threshold value $N_{ref1}$ and less than the threshold value $N_{ref2}$, and the intermediate square wave pulse pattern is used when the number of revolutions $N_m$ of the motor 32 is greater than or equal to the threshold value $N_{ref2}$. Therefore, the processing of setting the intermediate control mode pulse pattern in FIG. 6 is also performed.

Figure 15:
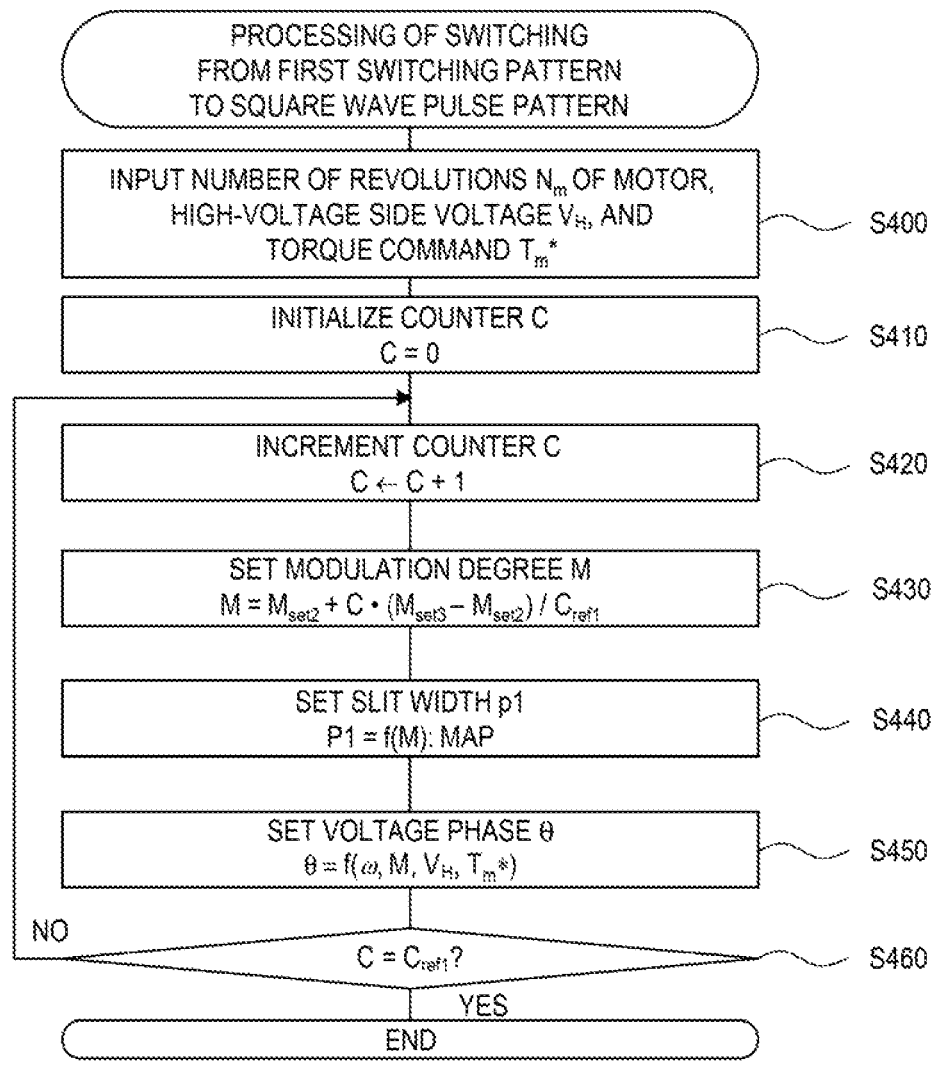
FIG. 15 is a flowchart illustrating an example of the processing of switching between the first switching pattern and the square wave pulse pattern, performed by the electronic control unit according to a second embodiment.

Next, the control in the control device mounted on the electric vehicle 120 according to the second embodiment, particularly the control when switching from the first switching pattern to the square wave pulse pattern and the control when switching from the second switching pattern to the first switching pattern will be described. FIG. 15 is a flowchart illustrating an example of processing of switching between the first switching pattern and the square wave pulse pattern, performed by the electronic control unit 50 of the electric vehicle 120 according to the second embodiment when switching from the first switching pattern to the square wave pulse pattern.

In the processing of switching between the first switching pattern and the square wave pulse pattern, first, the number of revolutions $N_m$ of the motor 32, the voltage $V_H$ of the high-voltage power line 42 from the voltage sensor 46a, the torque command $T_m^*$ of the motor 32, and the like, are input (step S400), and a counter C is initialized to the value zero (step S410). As the number of revolutions $N_m$ of the motor 32, a value calculated based on the rotation position $\theta_m$ from the rotation position detection sensor 32a can be input. The torque command $T_m^*$ set by the traveling control can be input. The counter C is used as a counter the present processing.

Subsequently, the processing in steps S420 to S460 is repeated until the counter C reaches a threshold value $C_{ref1}$. The threshold value $C_{ref1}$ has the number of steps at which the modulation degree M is changed step by step. In the repeated processing, first, the counter C is incremented by the value 1 (step S420), and the modulation degree M is set by the equation (1) below (step S430). As expressed in the equation (1), the modulation degree M is calculated by subtracting the threshold value $M_{set2}$ from the threshold value $M_{set3}$, dividing the result by the threshold value $C_{ref1}$, and multiplying this by the value of the counter C and adding the threshold value $M_{ref2}$ to this. In other words, the modulation degree M is calculated by determining an amount of change in one step by proportionally allotting the difference between the threshold value $M_{set3}$ and the threshold value $M_{set2}$ by the threshold value $C_{ref1}$, which is the number of repetitions, and changing the threshold value $M_{set2}$ by an amount of change according to the value of the counter C (the number of steps). the short pulse has the same width as the slit $$M=M_{set2}+C\cdot(M_{set3}-M_{set2})/C_{ref1} \quad (1)$$

Figure 16:
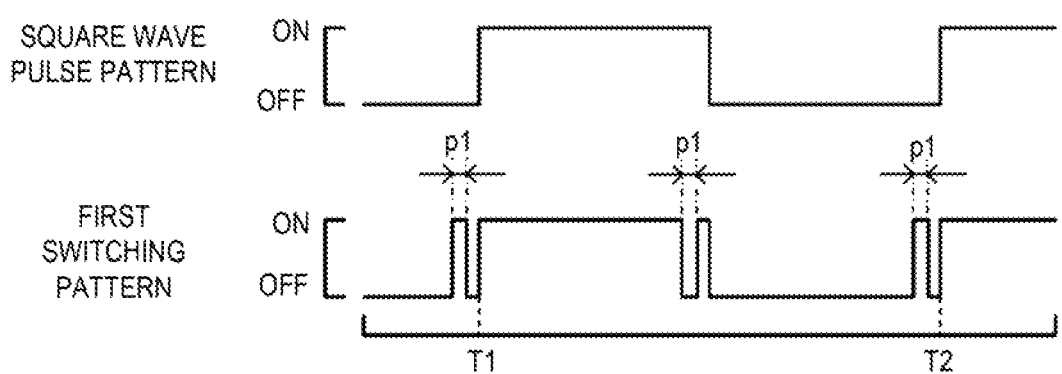
FIG. 16 is a diagram illustrating the square wave pulse pattern and the first switching pattern together with widths of a slit and a short pulse.
Figure 17:
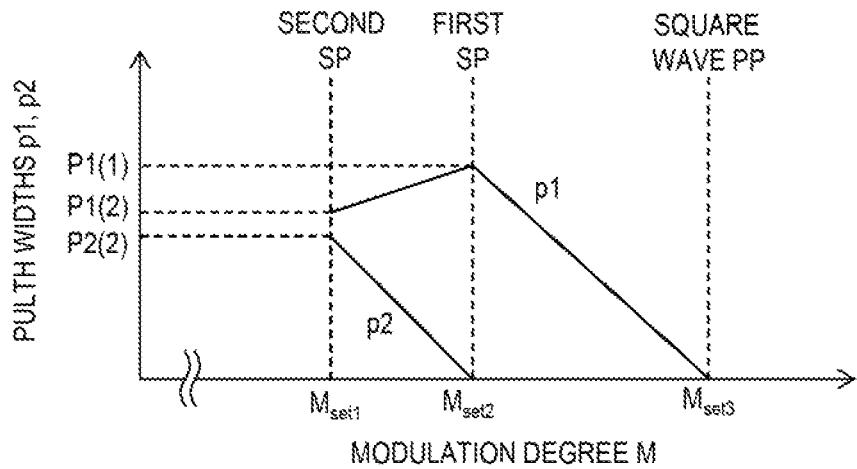
FIG. 17 is a diagram illustrating an example of a slit width setting map at the time of switching.

Subsequently, the slit width p1 in the first switching pattern is set based on the modulation degree M (step S440). As described above, since the slit and the short pulse has the same width in the first switching pattern, setting the slit width p1 means setting the short pulse width p1. FIG. 16 illustrates the square wave pulse pattern and the first switching pattern together with the slit and the short pulse widths p1. In the second embodiment, the slit width p1 is set by checking in advance the relationship between the slit width p1 and the modulation degree M, storing the relationship as a switching slit width setting map, and deriving a corresponding slit width p1 from the map when a modulation degree M is given. An example of the switching slit width setting map is illustrated in FIG. 17. FIG. 17 also illustrates a switching slit width setting map of the widths p1, p2 of the two slits when switching from the second switching pattern to the first switching pattern. In the switching slit width setting map used in the processing of switching between the first switching pattern and the square wave pulse pattern, the slit width p1 is represented by p1 between the threshold value $M_{set2}$ and the threshold value $M_{set3}$ in FIG. 17. The slit width p1 is gradually decreased from the value p1(1) at the threshold value $M_{set2}$ as the modulation degree M is increased from the threshold value $M_{set2}$, and becomes 0 when the modulation degree M reaches the threshold value $M_{set3}$. Further, since the modulation degree M is set step by step by the counter C, the slit width p1 is also set step by step.

Figure 18:
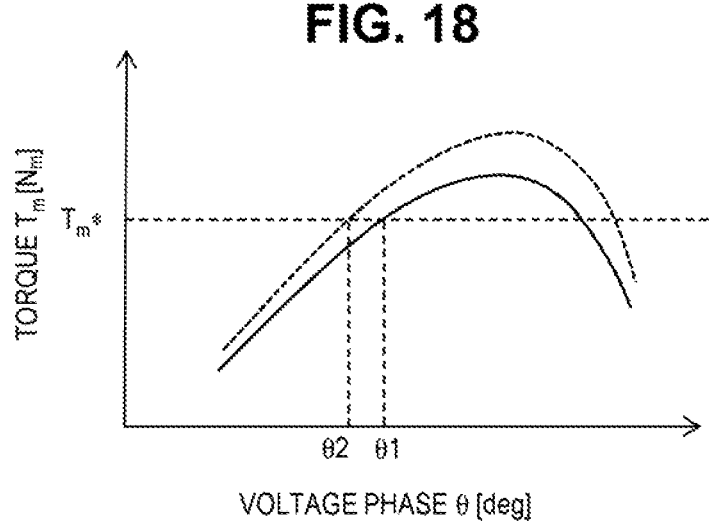
FIG. 18 is a diagram illustrating an example of the relationship between the torque of the motor and a voltage phase.
Figure 19:
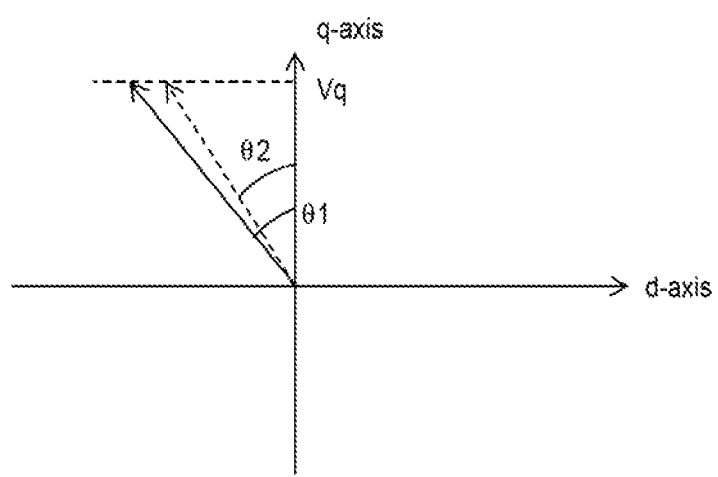
FIG. 19 is a diagram illustrating examples of a voltage vectors when torque of a torque command is output from the motor in the first switching pattern and the square wave pulse pattern.

Next, the voltage phase θ is set based on angular velocity ω, the modulation degree M, the voltage $V_H$ of the high-voltage power line 42, and the torque command $T_m$*(step S450). The angular velocity ω can be calculated from the number of revolutions $N_m$ of the motor 32. The relationship between the voltage phase θ and the torque $T_m$ of the motor 32 is obtained by the equation (2) below. In the equation (2), V is a value obtained by multiplying the voltage $V_H$ by the modulation degree M, p is the number of pole pairs of the motor 32, φ is a magnetic flux, $L_d$ is a d-axis inductance, and $L_q$ is a q-axis inductance. Therefore, when the angular velocity ω, the modulation degree M, the voltage $V_H$ of the high-voltage power line 42 are applied to the equation (2), the relationship between the torque $T_m$ and the voltage phase θ can be illustrated in the drawing. An example of the relationship between the torque $T_m$ and the voltage phase θ is illustrated in FIG. 18. In the figure, a curve shown by a solid line represents the relationship between the torque $T_m$ and the voltage phase θ in the first switching pattern, and a curve by the dotted line represents the relationship between the torque $T_m$ and the voltage phase θ in the square wave pulse pattern. Further, $T_m$* represents a torque command of the motor 32, θ1 represents a voltage phase when the torque of the torque command $T_m$* is output from the motor 32 in the first switching pattern, and θ2 represents a voltage phase when the torque of the torque command $T_m$* is output from the motor 32 in the square wave pulse pattern. As illustrated in the figure, a plurality (two in the figure) of voltage phases θ are present in each pattern with respect to the torque command $T_m$*, but the smallest voltage phase θ thereamong is used. Since the time of switching from the first switching pattern to the square wave pulse pattern is considered, the relationship between the torque $T_m$ and the voltage phase θ is an intermediate curve between the two curves. Therefore, the voltage phase θ to be obtained is a value between θ1 and θ2. FIG. 19 illustrates voltage vectors when the torque of the torque command $T_m$* is output from the motor 32 in the first switching pattern and the square wave pulse pattern. It can be seen in the figure that in order to make the torque $T_m$ of the motor 32 the same when switching from the first switching pattern to the square wave pulse pattern, the q-axis component $V_q$ of the voltage vector should become the same. Since the voltage phase θ to be obtained is a value between θ1 and θ2, the voltage vector becomes an intermediate vector between the two vectors in FIG. 19. Moreover, in the processing of step S450 according to the second embodiment, the voltage phase θ is set by obtaining in advance the smallest voltage phase θ with respect to the angular velocity ω, the modulation degree M, the voltage $V_H$ of the high voltage side power line 42, and the torque command $T_m$*, storing the smallest voltage phase θ as a voltage phase setting map, and deriving a corresponding voltage phase θ from the map when the angular velocity ω, the modulation degree M, the voltage $V_H$ of the high voltage side power line 42, and the torque command $T_m$* are given.

$$T_m = p\phi \frac{V}{\omega L_d} \sin\theta + \frac{p}{2} \frac{(L_d - L_q)}{L_d L_q}\left(\frac{V}{\omega}\right)^2 \sin 2\theta \qquad (2)$$

Subsequently, it is determined whether the counter C has reached the threshold value $C_{ref1}$ (step S460). When it is determined that the counter C has not reached the threshold value $C_{ref1}$, the processing returns to step S420. When it is determined that the counter C has reached the threshold value $C_{ref1}$, the processing is ended. As described above, the threshold value $C_{ref1}$ has the number of steps at which the modulation degree M is changed step by step, and is determined by the time required for repeating steps S420 to S460. In other words, the threshold value $C_{ref1}$ is decreased when the time required for performing steps S420 to S460 is long, and is increased when the time required for performing steps S420 to S460 is short. Therefore, since the number of steps, at which the modulation degree M is changed, can be increased as the threshold value $C_{ref1}$ is increased, it is possible to smoothly switch from the first switching pattern to the square wave pulse pattern.

Although the processing of switching between the first switching pattern and the square wave pulse pattern in FIG. 15 is performed when switching from the first switching pattern to the square wave pulse pattern, the processing can also be performed when switching from the square wave pulse pattern to the first switching pattern.

Figure 20:
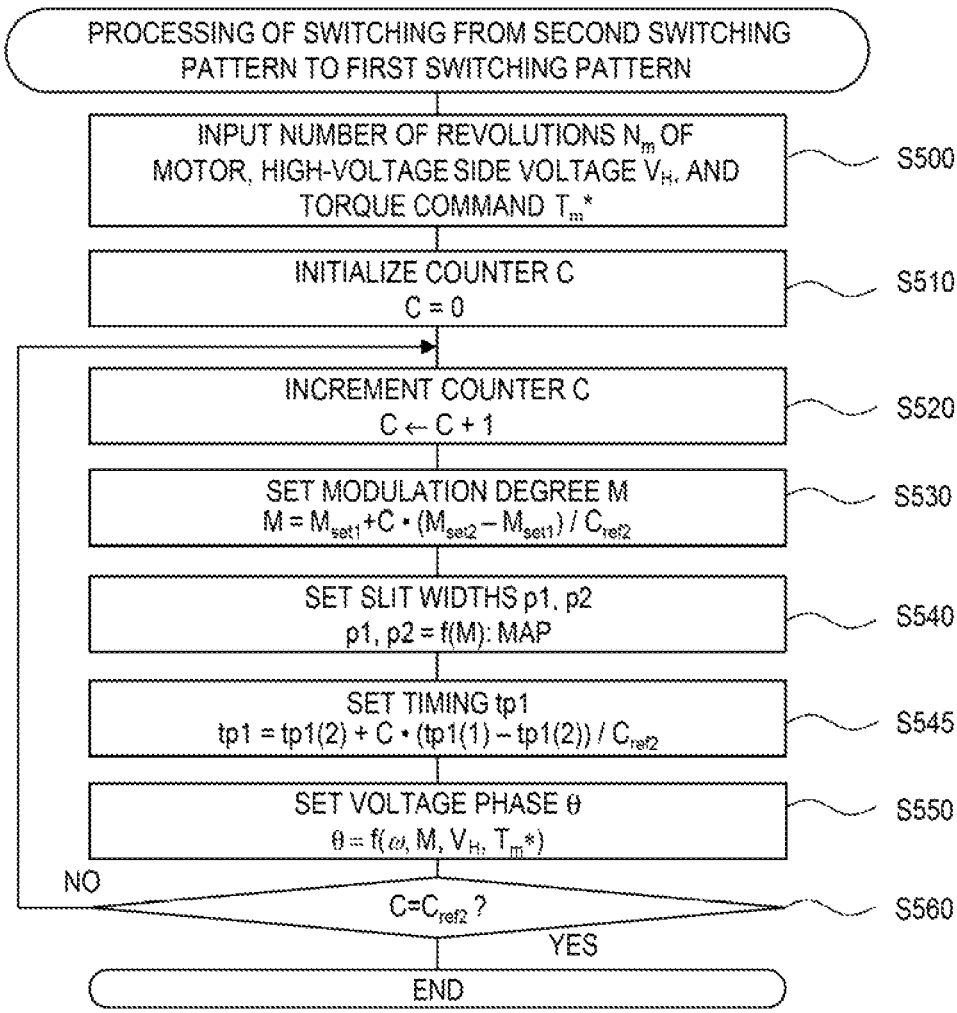
FIG. 20 is a flowchart illustrating an example of the processing of switching between the second switching pattern and the first switching pattern, performed by the electronic control unit according to the second embodiment.

FIG. 20 is a flowchart illustrating an example of the processing of switching between the second switching pattern and the first switching pattern, performed by the electronic control unit 50 of the electric vehicle 120 according to the second embodiment when switching from the second switching pattern to the first switching pattern. In the processing of switching between the second switching pattern and the first switching pattern, first, the number of revolutions $N_m$ of the motor 32, the voltage $V_H$ of the high-voltage power line 42 from the voltage sensor 46a, the torque command $T_m$* of the motor 32, and the like, are input (step S500), and the counter C is initialized to the value zero (step S510). Subsequently, the processing in steps S520 to S560 is repeated until the counter C reaches the threshold value $C_{ref2}$. The threshold value $C_{ref2}$ has the number of steps at which the modulation degree M is changed in steps.

In the repeated processing, first, the counter C is incremented by the value 1 (step S520), and the modulation degree M is set by the equation (3) below (step S530). As expressed in the equation (3), the modulation degree M is calculated by subtracting the threshold value $M_{set1}$ from the threshold value $M_{set2}$, dividing the result by the threshold value $C_{ref2}$, and multiplying this by the value of the counter C and adding the threshold value $M_{ref1}$ to this. In other words, the modulation degree M is calculated by determining an amount of change in one step by proportionally allotting the difference between the threshold value $M_{set2}$ and the threshold value $M_{set1}$ by the treshold value $C_{ref2}$ which is the number of repetitions, and changing the threshold value $M_{set1}$ by an amount of change according to the value of the counter C (the number of steps).

$$M = M_{set1} + C \cdot (M_{set2} - M_{set1})/C_{ref2} \qquad (3)$$

Figure 21:
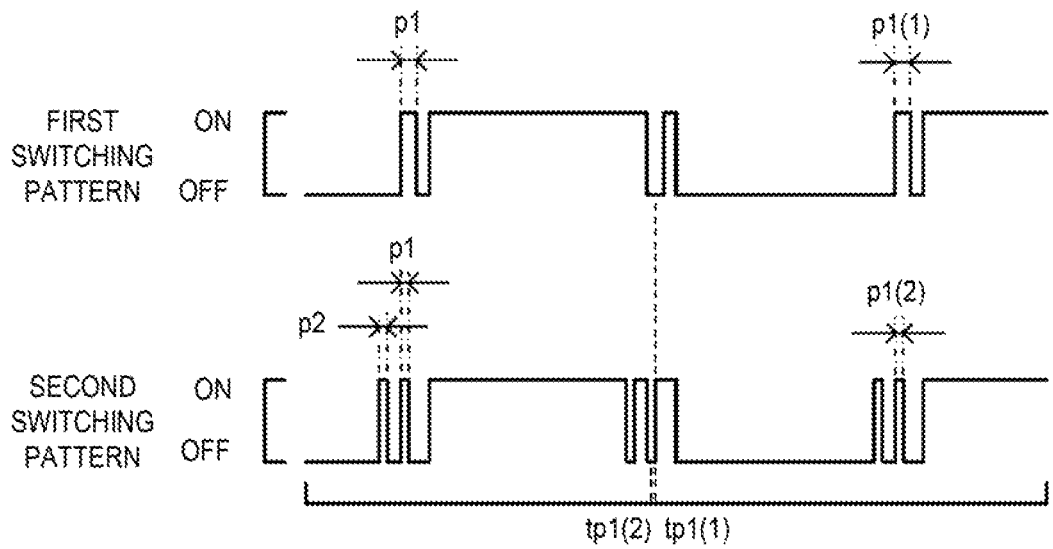
FIG. 21 is a diagram illustrating the second switching pattern and the first switching pattern together with widths of slits and short pulses.

Subsequently, two slit widths p1, p2 in the second switching pattern are set based on the modulation degree M (step S540). As described above, since the two slits in the first switching pattern respectively have the same widths as the two short pulses, setting the slit widths p1, p2 means setting the short pulse widths p1, p2. FIG. 21 illustrates the second switching pattern and the first switching pattern together with the slit and short pulse widths p1, p2. In the second embodiment, the slit widths p1, p2 are set by checking in advance the relationship between the slit widths p1 and p2 and the modulation degree M, storing the relationship as a switching slit width setting map, and deriving corresponding slit widths p1, p2 from the map when a modulation degree M is given. In the switching slit width setting map used to set the slit widths p1, p2, the slit widths p1, p2 are represented by p1, p2 between the threshold value $M_{set1}$ and the threshold value $M_{set2}$ in FIG. 17. The slit width p1 gradually gets close to the value p1(1) at the threshold value $M_{set2}$ from the value p1(2) at the threshold value Mset1 as the modulation degree M is increased from the threshold value $M_{set1}$, and becomes the value p1(1) when the modulation degree M reaches the threshold value $M_{set2}$. The slit width p2 is gradually $M_{set2}$. decreased from the value p2(2) at the threshold value Mset1 as the modulation degree M is increased from the threshold value $M_{set1}$, and becomes the value zero when the modulation degree M reaches the threshold value $M_{set2}$. Further, since the modulation degree M is set step by step by the counter C, the slit widths p1, p2 are also set step by step.

Next, timing tp1 of a slit and a short pulse (the slit and the short pulse having the slit width p1 in FIG. 21), among the two slits and the two short pulses in the second switching pattern, corresponding to the slit and short pulse in the first switching pattern is set by the equation (4) below (step S545). In the equation (4), tp1(2) is the timing from the starting point of the first half or the second half of the period of the slit or the short pulse having the slit width p1 in the second switching pattern, and tp1(1) is the timing from the starting point of the first half or the second half of the period of the slit or the short pulse having the slit width p1 in the first switching pattern. As expressed in the equation (4), the timing tp1 is calculated by subtracting timing tp1(2) from the timing tp1(1), dividing the result by the threshold value $C_{ref2}$, and multiplying this by the value of the counter C and adding the timing tp1(2) to this. In other words, the timing tp1 is calculated by determining an amount of change in one step by proportionally allotting the difference between the timing tp1(1) and the timing tp1(2) by the threshold value $C_{ref2}$ which is the number of repetitions, and changing the timing tp1(2) by an amount of change according to the value of the counter C (the number of steps). The timing tp1(1) of the slit or short pulse in the first switching pattern is slightly different from the timing tp1(2) of the corresponding slit or short pulse in the second switching pattern since the slits and the short pulses are formed and optimized such that the twelfth electric fluctuation frequency component is made higher in addition to the frequency of the sixth electric fluctuation frequency component. For the same reason as above, the width p1(1) of the slit or short pulse in the first switching pattern is slightly different from the width tp1(2) of the corresponding slit or short pulse in the second switching pattern. Since the modulation degree M is set step by step by the counter C, the timing tp1 is also set step by step.

$$tp1 = tp1(2) + C \cdot (tp1(1) - tp1(2))/C_{ref2} \quad (4)$$

Next, in a similar manner to step S450 of the processing of switching between the first switching pattern and the square wave pulse pattern in FIG. 15, the voltage phase θ is set based on the angular velocity ω, the modulation degree M, the voltage $V_H$ of the high-voltage power line 42, and the torque command $T_m^*$ (step S550), and it is determined whether the counter C has reached the threshold value $C_{ref2}$ (step S560). When it is determined that the counter C has not reached the threshold value $C_{ref2}$, the processing returns to step S520. When it is determined that the counter C has reached the threshold value $C_{ref2}$, the processing is ended. As described above, the threshold value $C_{ref2}$ has the number of steps at which the modulation degree M is changed in steps, and is determined by the time required for repeating steps S520 to S560. In other words, the threshold value $C_{ref2}$ is decreased when the time required for performing steps S520 to S560 is long, and is increased when the time required for performing steps S520 to S560 is short. Therefore, since the number of steps, at which the modulation degree M is changed, can be increased as the threshold value $C_{ref2}$ is increased, it is possible to smoothly switch from the second switching pattern to the first switching pattern.

Although the processing of switching between the second switching pattern and the first switching pattern in FIG. 20 is performed when switching from the second switching pattern to the first switching pattern, the processing can also be performed when switching from the first switching pattern to the second switching pattern.

By changing the first switching pattern to the intermediate first switching pattern and the square wave pulse pattern to the intermediate square wave pulse pattern, and applying the processing of switching between the first switching pattern and the square wave pulse pattern in FIG. 15, switching from the intermediate first switching pattern to the intermediate square wave pulse pattern in the intermediate control mode can be performed in a similar manner to switching from the first switching pattern to the square wave pulse pattern. Further, by changing the second switching pattern to the intermediate second switching pattern and the first switching pattern to the intermediate first switching pattern, and applying the processing of switching between the first switching pattern and the second switching pattern in FIG. 20, switching from the intermediate second switching pattern to the intermediate first switching pattern in the intermediate control mode can be performed in a similar manner to switching from the second switching pattern to the first switching pattern.

In the control device mounted on the electric vehicle 120 according to the second embodiment described above, when switching from the first switching pattern to the square wave pulse pattern in the square wave control mode, the widths p1 of the slit and the short pulse of the first switching pattern gradually change to become small. As such, it is possible to curb vibration due to the torque fluctuation occurring together with a sudden change in the modulation degree M that may occur when switching from the first switching pattern to the square wave pulse pattern. Moreover, when switching from the second switching pattern to the first switching pattern in the square wave control mode, the widths p1 of the slit and the short pulse, among the two slits and the two short pulses in the second switching pattern, corresponding to the slit and the short pulse in the first switching pattern gradually change to get close to the width p1(1) of the slit and the short pulse in the first switching pattern. Further, the widths p2 of the added slit and short pulse, among the two slits and the two short pulses in the second switching pattern, gradually changes to become small. As such, it is possible to curb vibration due to the torque fluctuation occurring together with a sudden change in the modulation degree M that may occur when switching from the second switching pattern to the first switching pattern.

In addition, switching from the intermediate first switching pattern to the intermediate square wave pulse pattern or switching from the intermediate second switching pattern to the intermediate first switching pattern in the intermediate control mode is also performed in a similar manner to switching from the first switching pattern to the square wave pulse pattern or switching from the second switching pattern to the first switching pattern in the square wave control mode. As such, it is possible to curb vibration due to the torque fluctuation occurring together with a sudden change in the modulation degree M that may occur when switching from the intermediate first switching pattern to the intermediate square wave pulse pattern or switching from the intermediate second switching pattern to the intermediate first switching pattern in the intermediate control mode.

Figure 22:
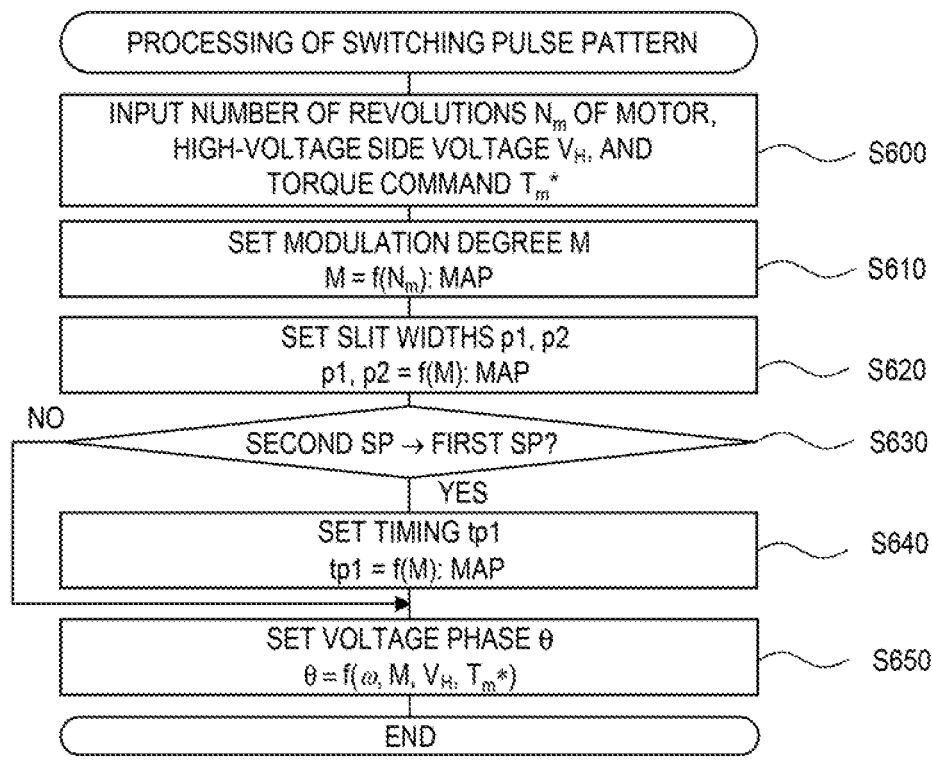
FIG. 22 is a flowchart illustrating an example of the processing of switching pulse pattern in the modified example.

In the control device mounted on the electric vehicle 120 according to the second embodiment, switching from the first switching pattern to the square wave pulse pattern or switching from the second switching pattern to the first switching pattern in the square wave control mode is performed step by step using the counter C. However, the slit widths p1, p2 may gradually change at the time of switching without using the counter C. For example, the processing of switching the pulse pattern in FIG. 22 may be performed instead of the processing of switching between the first switching pattern and the square wave pulse pattern in FIG. 15, or the processing of switching between the second switching pattern and the first switching pattern in FIG. 22. The processing of switching the pulse pattern in FIG. 22 is repeatedly performed at every predetermined time (for example, every several milliseconds) in the square wave control mode.

Figure 23:
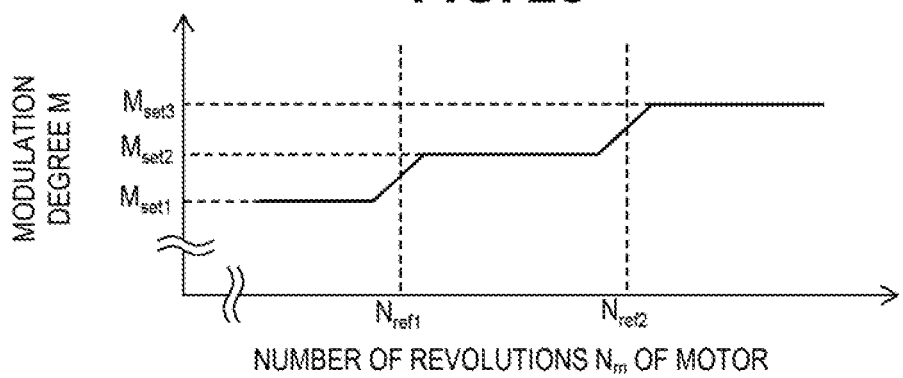
FIG. 23 is a diagram illustrating a modulation degree setting map.

In the processing of switching the pulse pattern, first, the number of revolutions $N_m$ of the motor 32, the voltage $V_H$ of the high-voltage power line 42 from the voltage sensor 46a, the torque command $T_m^*$ of the motor 32, and the like, are input (step S600), and the modulation degree M is set according to the number of revolutions $N_m$ of the motor (step S610). In the present modified example, the modulation degree M is set by determining in advance the number of revolutions $N_m$ of the motor 32 and the modulation degree M, storing the determined number of revolutions $N_m$ of the motor 32 and the modulation degree M as a modulation degree setting map, and deriving a corresponding modulation degree M from the map when the number of revolutions $N_m$ of the motor 32 is given. An example of the modulation degree setting map is illustrated in FIG. 23. As shown in the figure, the modulation degree M is increased with an inclination so as to smoothly change around the threshold value $N_{ref1}$ and the threshold value $N_{ref2}$. In other words, when the number of revolutions $N_m$ of the motor 32 is increased and gets close to the threshold value $N_{ref1}$, the modulation degree M is increased from the value $M_{set1}$ toward the value $M_{set2}$ as the number of revolutions $N_m$ is increased, and when the number of revolutions $N_m$ of the motor 32 is increased and gets close to the threshold value $N_{ref2}$, the modulation degree M is increased from the value $M_{set2}$ toward the value $M_{set3}$ as the number of revolutions $N_m$ is increased.

Figure 24:
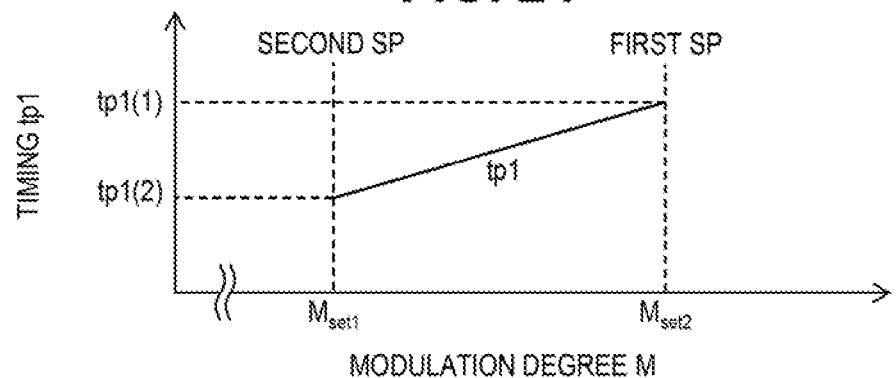
FIG. 24 is a diagram illustrating an example of a time setting map.

Subsequently, the slit width p1 of the first switching pattern and the two slit widths p1, p2 of the second switching pattern are set based on the modulation degree M (step S620). Setting the slit widths p1, p2 is the same as step S440 of the processing of switching between the first switching pattern and the square pulse pattern in FIG. 15, and step S540 of the processing of switching between the second switching pattern and the first switching pattern in FIG. 20. Then, it is determined whether switching of the pulse pattern is switching from the second switching pattern to the first switching pattern (step S630). When it is determined that the switching is from the second switching pattern to the first switching pattern, the timing tp1 of the slit and the short pulse having the width p1 is set based on the modulation degree M (step S640). In the present modified example, the timing tp1 is set by determining in advance the relationship between the modulation degree M and the timing tp1, storing the relationship as a timing setting map, and deriving a corresponding timing tp1 from the map when the modulation degree M is given. An example of the timing setting map is illustrated in FIG. 24. In the present modified example, as shown in the figure, as the modulation degree M is increased, the timing tp1 is set to get closer to the timing pt1(1) of the slit and the short pulse having the slit width p1 in the first switching pattern where the modulation degree M is the value $M_{set2}$ from the timing tp1(2) of the slit and the short pulse having the slit width p1 in the second switching pattern where the modulation degree M is the value $M_{set1}$. In addition, when it is determined in step S630 that switching from the second switching pattern to the first switching pattern is not performed, the processing of setting the timing tp1 is unnecessary because the switching is from the first switching pattern to the square wave pulse pattern.

Next, in a similar manner to step S450 of the processing of switching between the first switching pattern and the square wave pulse pattern in FIG. 15, the voltage phase θ is set based on the angular velocity ω, the modulation degree M, the voltage $V_H$ of the high-voltage power line 42, and the torque command $T_m^*$ (step S650). Then, the processing is ended.

Switching from the second switching pattern to the first switching pattern and switching from the first switching pattern to the square wave pulse pattern have been described above using the pulse pattern switching processing. However, in a similar manner to the above, switching from the square wave pulse pattern to the first switching pattern and switching from the first switching pattern to the second switching pattern in the pulse pattern switching processing can be performed. Moreover, the pulse pattern switching processing in FIG. 22 can be applied to switching between the intermediate second switching pattern and the intermediate first switching pattern, and switching between the intermediate first switching pattern and the intermediate square wave pulse pattern in the intermediate control mode.

In the similar manner to the above-described control device mounted on the electric vehicle of the modified example, when switching between the first switching pattern and the square wave pulse pattern in the square wave control mode, the width p1 of the slit and the short pulse of the first switching pattern gradually changes. As such, it is possible to curb vibration due to torque fluctuation occurring together with a sudden change of the modulation degree M that may occur when switching between the first switching pattern and the square wave purse pattern. Further, when switching between the second switching pattern and the first switching pattern in the square wave control mode, the width p1 of the slit and the short pulse, among the two slits and the two short pulses in the second switching pattern, corresponding to the slit and the short pulse in the first switching pattern gradually changes, and the width p2 of the added slit and short pulse, among the two slits and the two short pulses in the second switching pattern gradually changes. As such, it is possible to curb vibration due to torque fluctuation occurring together with a sudden change in the modulation degree M that may occur when switching between the second switching pattern and the first switching pattern.

In the control device mounted on the electric vehicle 120 according to a second embodiment or a modified example thereof, the intermediate control mode has the intermediate second switching pattern, the intermediate first switching pattern, and the intermediate square wave pulse pattern. However, as illustrated in the relationship between the number of revolutions $N_m$ of the motor 32, the torque $T_m$, and the control mode of the modified example in FIG. 9, the intermediate control mode may have the intermediate second switching pattern and the intermediate first switching pattern, but does not have to have the intermediate square wave pulse. Further, as illustrated in the relationship between the number of revolutions $N_m$ of the motor 32, the torque $T_m$, and the control mode of the modified example in FIGS. 12 and 13, the square wave control mode may have the square wave pulse pattern and the first switching pattern, but does not have to have the second switching pattern. In addition, the intermediate control mode does not have to be provided.

The correspondence between the main elements in the embodiment and the main elements described in the SUMMARY has been described. In the embodiment, the motor 32 is an "electric motor", the inverter 34 is an "inverter", the battery 36 is a "power storage device", and the electronic control unit 50 is a "control device".

In addition, the correspondence between the main elements in the embodiment and the main elements described in the SUMMARY does not limit the elements described in the SUMMARY since the embodiment is an example for specifically explaining an aspect to implement the present disclosure. In other words, the main elements described in the SUMMARY should be interpreted based on the description therein, and the embodiment is merely a specific example of the main elements described in the SUMMARY.

As above, although the aspect for implementing the present disclosure has been described with reference to the embodiment, the embodiment of the present disclosure is not limited thereto at all, and various variations can surely be made within the technical scope of the present disclosure.

The present disclosure is applicable to the manufacturing industry for an electric motor control device.

What is claimed is:

1. An electric motor control device mounted on a drive device including an electric motor, an inverter configured to drive the electric motor, and a power storage device configured to exchange power with the electric motor through the inverter, the electric motor control device comprising an electronic control unit configured to:
   perform switching control of a switching element of the inverter in pulse width modulation control mode when a modulation degree is less than a first predetermined value;
   perform switching control of the switching element of the inverter in square wave control mode when the modulation degree is greater than or equal to a second predetermined value, which is greater than the first predetermined value; and
   perform switching control of the switching element of the inverter in intermediate control mode when the modulation degree is greater than or equal to the first predetermined value and less than the second predetermined value, the intermediate control mode using a switching pattern in which, in a pulse pattern in the square wave control mode, a slit is formed in a case where a pulse is present at a time when a phase current crosses zero and a short pulse having the same width as the slit is formed in a case where the pulse is not present at the time when the phase current crosses zero.

2. The electric motor control device according to claim 1, wherein the intermediate control mode is mode using the switching pattern in which the widths of the slit and the short pulse are decreased as the modulation degree is increased.

3. The electric motor control device according to claim 2, wherein the electronic control unit is configured to gradually change the widths of the slit and the short pulse until the widths become zero when switching from the intermediate control mode to the square wave control mode.

4. The electric motor control device according to claim 1, wherein:
   the square wave control mode uses, when the number of revolutions of the electric motor is greater than or equal to a first predetermined number of revolutions which is greater than a first resonance region, a square wave pulse pattern in which a first half or a second half of one period becomes a square wave pulse, and uses, when the number of revolutions of the electric motor is less than the first predetermined number of revolutions, a first switching pattern in which one or more slits are formed in a region where the square wave pulse is present and one or more short pulses, having the same width as the slits, are formed at the same time when the slits are formed, in a region where the square wave pulse is not present in the square wave pulse pattern, the first switching pattern curbing LC resonance in the first resonance region; and
   the second predetermined value is greater when the number of revolutions of the electric motor is greater than or equal to the first predetermined number of revolutions than when the number of revolutions is less than the first predetermined number of revolutions.

5. The electric motor control device according to claim 4, wherein:
   the square wave control mode uses a second switching pattern when the number of revolutions of the electric motor is less than a second predetermined number of revolutions which is less than the first predetermined number of revolutions, the second switching pattern having a larger number of slits and short pulses than the slits and the short pulses of the first switching pattern and curbing LC resonance in a second resonance region included in a range of the number of revolutions less than the second predetermined number of revolution; and
   the second predetermined value is less when the number of revolutions of the electric motor is less than the second predetermined number of revolutions than when the number of revolutions is greater than or equal to the second predetermined number of revolutions.

6. An electric motor control device mounted on a drive device including an electric motor, an inverter configured to drive the electric motor, and a power storage device configured to exchange power with the electric motor through the inverter, the electric motor control device comprising an electronic control unit configured to:
   perform switching control of a switching element of the inverter by switching between pulse width modulation control mode and square wave control mode according to a modulation degree, wherein the square wave control mode uses, when the number of revolutions of the electric motor is greater than or equal to a first predetermined number of revolutions which is greater than a first resonance region, a square wave pulse pattern in which a first half or a second half of one period becomes a square wave pulse, and uses, when the number of revolutions of the electric motor is less than the first predetermined number of revolutions which is greater than a first resonance region, a first switching pattern in which one or more slits are formed in a region where the square wave pulse is present and one or more short pulses, having the same width as the slits, are formed at the same time when the slits are formed, in a region where the square wave pulse is not present in the square wave pulse pattern, the first switching pattern curbing LC resonance in the first resonance region; and perform control of a first gradual variation in which widths of the slits and the short pulses of the first switching pattern gradually change to become small, when switching from the first switching pattern to the square wave pulse pattern.

7. The electric motor control device according to claim 6, wherein the electronic control unit is configured to, as the control of the first gradual variation, set the widths of the slits and the short pulses, or the modulation degree step by step in a plurality of steps.

8. The electric motor control device according to claim 7, wherein the electronic control unit is configured to, as the control of the first gradual variation, set a voltage phase according to the set modulation degree, and perform switching control of the switching element of the inverter such that the set voltage phase is achieved in the first switching pattern in which the set widths of the slits and the short pulses are used.

9. The electric motor control device according to claim 6, wherein the electronic control unit is configured to, as the control of the first gradual variation when the number of revolutions of the electric motor exceeds a first threshold number of revolutions for switching the first switching pattern to the square wave pulse pattern, set the modulation degree to be gradually increased from the modulation degree of the first switching pattern toward the modulation degree of the square wave pulse pattern, and set the widths of the slits and the short pulses by using the set modulation degree and a relationship in which the widths are decreased, as the modulation degree is increased.

10. The electric motor control device according to claim 6, wherein:

the square wave control mode uses a second switching pattern when the number of revolutions of the electric motor is less than a second predetermined number of revolutions which is less than the first predetermined number of revolutions, in which the second switching pattern has a larger number of slits and short pulses than the slits and the short pulses of the first switching pattern, and curbing LC resonance in the second resonance region included in a range of number of revolutions less than the second predetermined number of revolutions;

the electronic control unit is configured to, when switching from the second switching pattern to the first switching pattern, perform control of a second gradual variation in which the widths of the slits and the short pulses of the second switching pattern, which do not correspond to the slits and short pulses of the first switching pattern, gradually change to become small.

11. The electric motor control device according to claim 10, wherein the electronic control unit is configured to, as the control of the second gradual variation, set the widths of the slits and the short pulses, or the modulation degree step by step in a plurality of steps.

12. The electric motor control device according to claim 10, wherein the electronic control unit is configured to, as the control of the second gradual variation when the number of revolutions of the electric motor exceeds a second threshold number of revolutions for switching the second switching pattern to the first switching pattern, set the modulation degree to be gradually increased from the modulation degree of the second switching pattern toward the modulation degree of the first switching pattern, and set the widths of the slits and the short pulses by using the set modulation degree and the relationship in which the widths are decreased, as the modulation degree is increased.

13. The electric motor control device according to claim 11, wherein the electronic control unit is configured to, as the control of the second gradual variation, set a voltage phase according to the set modulation degree, and perform switching control of the switching element of the inverter such that the set voltage phase is achieved in the second switching pattern in which the set widths of the slits and the short pulses are used.

14. The electric motor control device according to claim 10, wherein the electronic control unit is configured to, as the control of the second gradual variation when switching from the second switching pattern to the first switching pattern, gradually change one or more slits and short pulses, among the slits and the short pulses in the second switching pattern, corresponding to the slits and the short pulses in the first switching pattern such that a timing and the widths of the corresponding slits and the short pulses match the timing and the widths of the slits and the short pulses in the first switching pattern.

* * * * *